(12) United States Patent
Pringle, IV et al.

(10) Patent No.: US 11,376,623 B2
(45) Date of Patent: Jul. 5, 2022

(54) APPARATUSES FOR DISPENSING FLOWABLE MATERIALS

(71) Applicant: The Boeing Company, Chicago, IL (US)

(72) Inventors: John W. Pringle, IV, Torrance, CA (US); Angelica Davancens, Reseda, CA (US); Branko Sarh, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 159 days.

(21) Appl. No.: 16/826,560

(22) Filed: Mar. 23, 2020

(65) Prior Publication Data

US 2020/0215564 A1 Jul. 9, 2020

Related U.S. Application Data

(62) Division of application No. 16/176,875, filed on Oct. 31, 2018, now Pat. No. 10,682,663.

(51) Int. Cl.
*B05C 1/04* (2006.01)
*B05C 1/00* (2006.01)
(Continued)

(52) U.S. Cl.
CPC ............... *B05C 1/04* (2013.01); *B05C 1/006* (2013.01); *B05C 5/0291* (2013.01);
(Continued)

(58) Field of Classification Search
CPC ......... B05C 1/04; B05C 1/006; B05C 5/0291; B05C 11/023; B05C 11/1002; B05C 5/02; B05C 17/002; B05C 17/015; B05C 9/02; B05C 17/00543; G01F 11/022; G01F 11/21; G01F 11/021
(Continued)

(56) References Cited

U.S. PATENT DOCUMENTS 3,997,084 A * 12/1976 Davis, Jr. ............ B05C 17/0103
222/326
4,976,372 A * 12/1990 Rogers, Jr. ............ B05C 17/015
184/39
(Continued)

FOREIGN PATENT DOCUMENTS

| CN | 107728430 A | 2/2018 |
|---|---|---|
| CN | 107787254 A | 3/2018 |
| WO | 2016201277 A1 | 12/2016 |

OTHER PUBLICATIONS

U.S. Appl. No. 16/176,875, Notice of Allowance dated Feb. 13, 2020, 12 pgs.

(Continued)

*Primary Examiner* — Vishal Pancholi
*Assistant Examiner* — Robert K Nichols, II
(74) *Attorney, Agent, or Firm* — Kwan & Olynick LLP

(57) ABSTRACT

An apparatus for dispensing a flowable material is disclosed. The apparatus comprises a rotary actuator, a reservoir, containing a hydraulic fluid, a piston, movable inside the reservoir, a linear actuator, coupled to the piston, a gear train, coupling the rotary actuator with the linear actuator, and a flowable-material dispenser, hydraulically coupled with the reservoir.

19 Claims, 15 Drawing Sheets

(51) Int. Cl.
    *B05C 5/02* (2006.01)
    *B05C 11/02* (2006.01)
    *B05C 11/10* (2006.01)
    *G01F 11/02* (2006.01)

(52) U.S. Cl.
    CPC ........ *B05C 11/023* (2013.01); *B05C 11/1002* (2013.01); *G01F 11/022* (2013.01)

(58) Field of Classification Search
    USPC ....... 222/252, 253, 262, 333, 334, 389, 325, 222/326
    See application file for complete search history.

(56) References Cited

U.S. PATENT DOCUMENTS

| | | |
|---|---|---|
| 6,575,331 B1 | 6/2003 | Peeler et al. |
| 6,715,506 B1 | 4/2004 | Ikushima |
| 7,854,348 B2 * | 12/2010 | Wang .................... G01F 11/026 222/63 |
| 8,651,046 B1 | 2/2014 | Davancens et al. |
| 10,099,240 B2 | 10/2018 | Pringle, IV et al. |
| 10,105,728 B2 | 10/2018 | Pringle, IV et al. |
| 10,682,663 B2 | 6/2020 | Pringle, IV et al. |
| 2016/0361734 A1 | 12/2016 | Routen et al. |
| 2017/0106402 A1 | 4/2017 | Pringle, IV et al. |
| 2018/0178968 A1 * | 6/2018 | Phipps .................. A45D 40/00 |
| 2018/0221909 A1 | 8/2018 | Tudor et al. |
| 2020/0130008 A1 | 4/2020 | Pringle, IV et al. |

OTHER PUBLICATIONS

European Application Serial No. 19195013.8, European Search Report dated Mar. 31, 2020, 7 pgs.

Chinese Application Serial No. 201910972068.9, Office Action dated Jul 22, 2021, 27 pgs.

* cited by examiner

Continued from FIG. 7A

Turn Rotary Actuator in Second Rotational Direction
760

Monitor Pressure Inside Reservoir
762

Hermetically Seal Plunger against End-Cap of Flowable-Material Dispenser
764

Admit Atmosphere into Cartridge Tube
766

Unlock Over-Center Mechanism
770

Couple Plunger to End-Cap
772

Maintain Negative Pressure of Hydraulic Fluid
774

Remove Cartridge Tube from Cartridge Housing
780

*FIG. 7B*

APPARATUSES FOR DISPENSING FLOWABLE MATERIALS

CROSS-REFERENCE TO RELATED APPLICATIONS

This application is a divisional of U.S. patent application Ser. No. 16/176,875, entitled: "APPARATUSES AND METHODS FOR DISPENSING FLOWABLE MATERIALS", filed on 2018 Oct. 31, which is incorporated herein by reference in its entirety for all purposes.

TECHNICAL FIELD

The present disclosure generally relates to apparatuses and methods for dispensing flowable materials and, more specifically, to dispensing flowable materials using rotary actuators and hydraulic means.

BACKGROUND

Flowable materials are commonly dispensed using direct mechanical action. For example, a manual caulking gun has a trigger, configured to advance a plunger that extrudes material from a cartridge. However, manual activation of the trigger to extrude the flushable material, which often has a glutinous consistency, is physically demanding and, accordingly, difficult to control. Pneumatic action is readily available to supplement or replace direct mechanical action when force amplification is required. However, compressible nature of gases results in a loss of precision when pneumatic action is used for dispensing flowable materials. Overall, conventional devices and methods of dispensing flowable materials lack precision, needed in certain critical applications, such as aerospace.

SUMMARY

Accordingly, apparatuses and methods, intended to address at least the above-identified concerns, would find utility.

The following is a non-exhaustive list of examples, which may or may not be claimed, of the subject matter disclosed herein.

One example of the subject matter, disclosed herein, relates to an apparatus for dispensing a flowable material. The apparatus comprises a rotary actuator, a reservoir, containing a hydraulic fluid, a piston, movable inside the reservoir, a linear actuator, coupled to the piston, a gear train, coupling the rotary actuator with the linear actuator, and a flowable-material dispenser, hydraulically coupled with the reservoir.

Using the rotary actuator and direct mechanical or hydraulic coupling between various components of the apparatus provides high dispensing precision. Specifically, the linear movement of the piston inside the reservoir, containing the hydraulic fluid, is precisely controlled by the rotary actuator, such as a stepper motor. The rotary actuator is coupled to the linear actuator using the gear train, while the linear actuator is coupled to the piston. The linear movement of the piston transfers at least a portion of the hydraulic fluid between the reservoir and the flowable-material dispenser. The hydraulic fluid, once transferred to the flowable-material dispenser, displaces the flowable material from the flowable-material dispenser in a precise manner. It should be noted that the volume of the hydraulic fluid, displaced from the reservoir, is the same as the volume of the hydraulic fluid received in the flowable-material dispenser since hydraulic fluid is not compressible. As such, the dispensing of the flowable material is precisely controlled by the movement of the piston inside the reservoir, which in turn is precisely controlled by the rotary actuator. Overall, the rotary actuator controls precise dispensing of the flowable material through mechanical and hydraulic coupling between various components of the apparatus. Furthermore, the hydraulic coupling allows more flexible positioning of the flowable-material dispenser relative to the rotary actuator, thereby resulting in the apparatus being compact.

Another example of the subject matter, disclosed herein, relates to a method for dispensing a flowable material using an apparatus. The apparatus comprises a rotary actuator, a reservoir, containing a hydraulic fluid, a piston, movable inside the reservoir, a linear actuator, coupled to the piston, a gear train, coupling the rotary actuator with the linear actuator, a flowable-material dispenser, comprising a cartridge housing and a plunger and hydraulically coupled with the reservoir, an end-cap, movably coupled with the flowable-material dispenser, and an over-center mechanism, movably coupling the end-cap with the cartridge housing of the flowable-material dispenser. The method comprises holding the hydraulic fluid in the reservoir at a negative pressure, sufficient to generate a vacuum between the end-cap and the plunger, inserting a cartridge tube, having an interior, into the cartridge housing, wherein the flowable material is inside the cartridge tube, locking the over-center mechanism relative to the cartridge housing so that a hermetic seal is created between the plunger and the interior of the cartridge tube and between the end-cap and the interior of the cartridge tube, and turning the rotary actuator in a rotational direction so that the linear actuator advances the piston within the reservoir to transfer at least a portion of the hydraulic fluid from the reservoir to the flowable-material dispenser through the end-cap and into the interior of the cartridge tube, causing the plunger to advance within the cartridge tube in a forward plunger direction, away from the end-cap.

When the hydraulic fluid is held at the negative pressure in the reservoir, this negative pressure is also present in all other areas of the apparatus occupied by the hydraulic fluid. As a result, the plunger, which contacts the hydraulic fluid, is forced by the hydraulic fluid toward and against the end-cap. This force supports the plunger on the end-cap and allows positioning the plunger away from the cartridge housing when the end-cap is moved away from the cartridge housing. This position of the plunger and the end-cap, away from the cartridge housing, provides access to the cartridge housing, allowing insertion of the cartridge tube into the cartridge housing.

When the over-center mechanism is locked relative to the cartridge housing, the plunger is pressed by the end-cap into the interior of the cartridge tube and is hermetically sealed against the interior of the cartridge tube. The hermetic seal prevents the flowable material from flowing past the plunger. Furthermore, the hermetic seal prevents the hydraulic fluid from flowing past the plunger and reaching the flowable material while still allowing the plunger to advance within the cartridge tube.

Another hermetic seal is formed between the end-cap and the interior of the cartridge tube. This seal keeps the hydraulic fluid within the interior of the cartridge tube when the hydraulic fluid is transferred into the interior of the cartridge tube and maintained at a positive pressure or a negative pressure (e.g., to advance the plunger within the cartridge tube). This seal is maintained while the end-cap is positioned at a first end of the cartridge housing.

When the rotary actuator is turned in a rotational direction, the linear actuator advances the piston within the reservoir. The rotational speed and the degree of rotation (e.g., the number of rotations) of the rotary actuator are precisely controlled. This control translates into the precise linear motion of the piston. As the piston moves within the reservoir, at least a portion of the hydraulic fluid is transferred from the reservoir to the flowable-material dispenser. Specifically, the hydraulic fluid flows through the end-cap into the interior of the cartridge tube. This addition of the hydraulic fluid causes the plunger to advance within the cartridge tube in a forward plunger direction away from the end-cap. As a result, the flowable material is displaced by the plunger out of the cartridge tube. The precision of the rotary actuator results in the flowable material being dispensed in a controlled manner.

BRIEF DESCRIPTION OF THE DRAWINGS

Figure 1A:
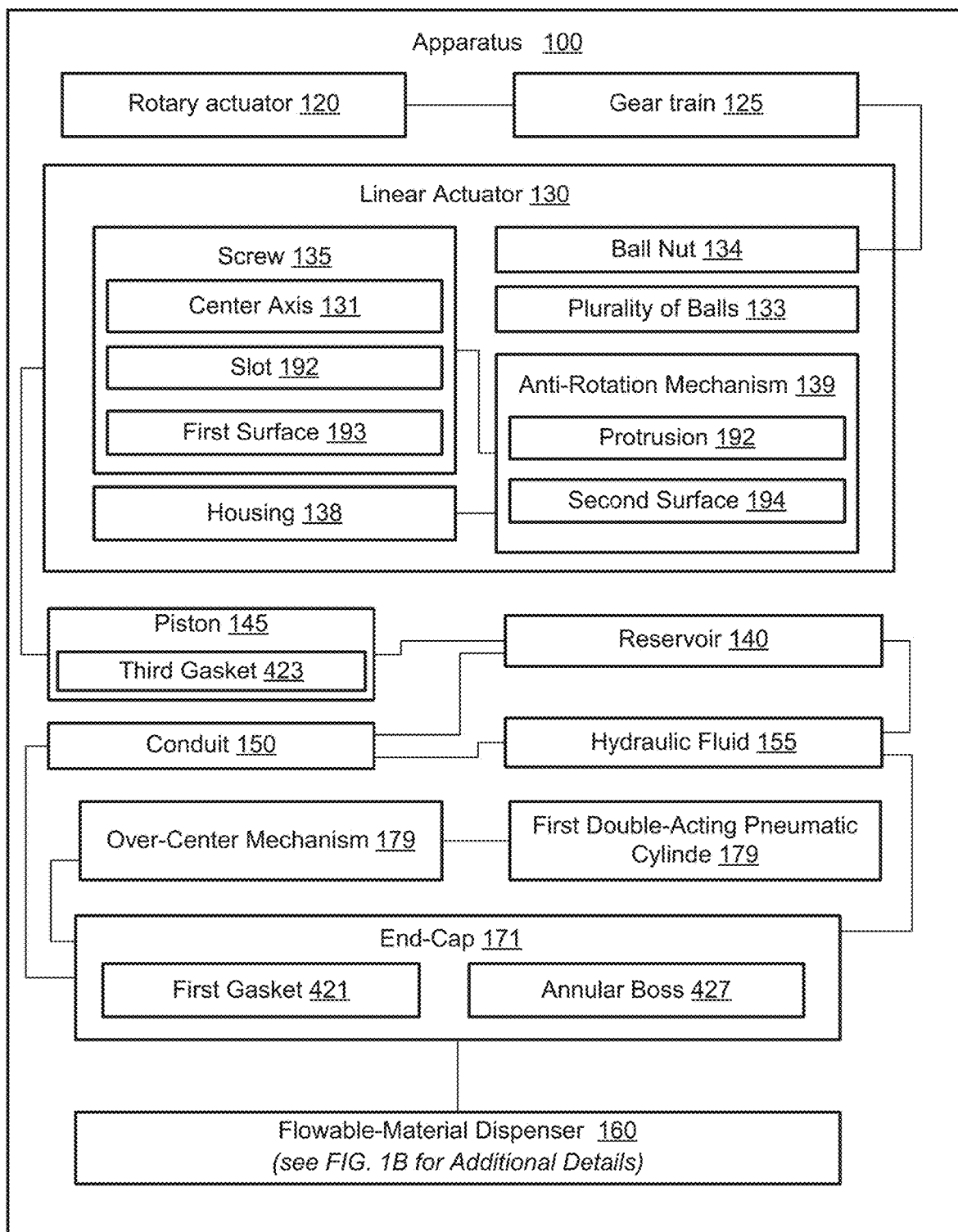
Figure 1B:
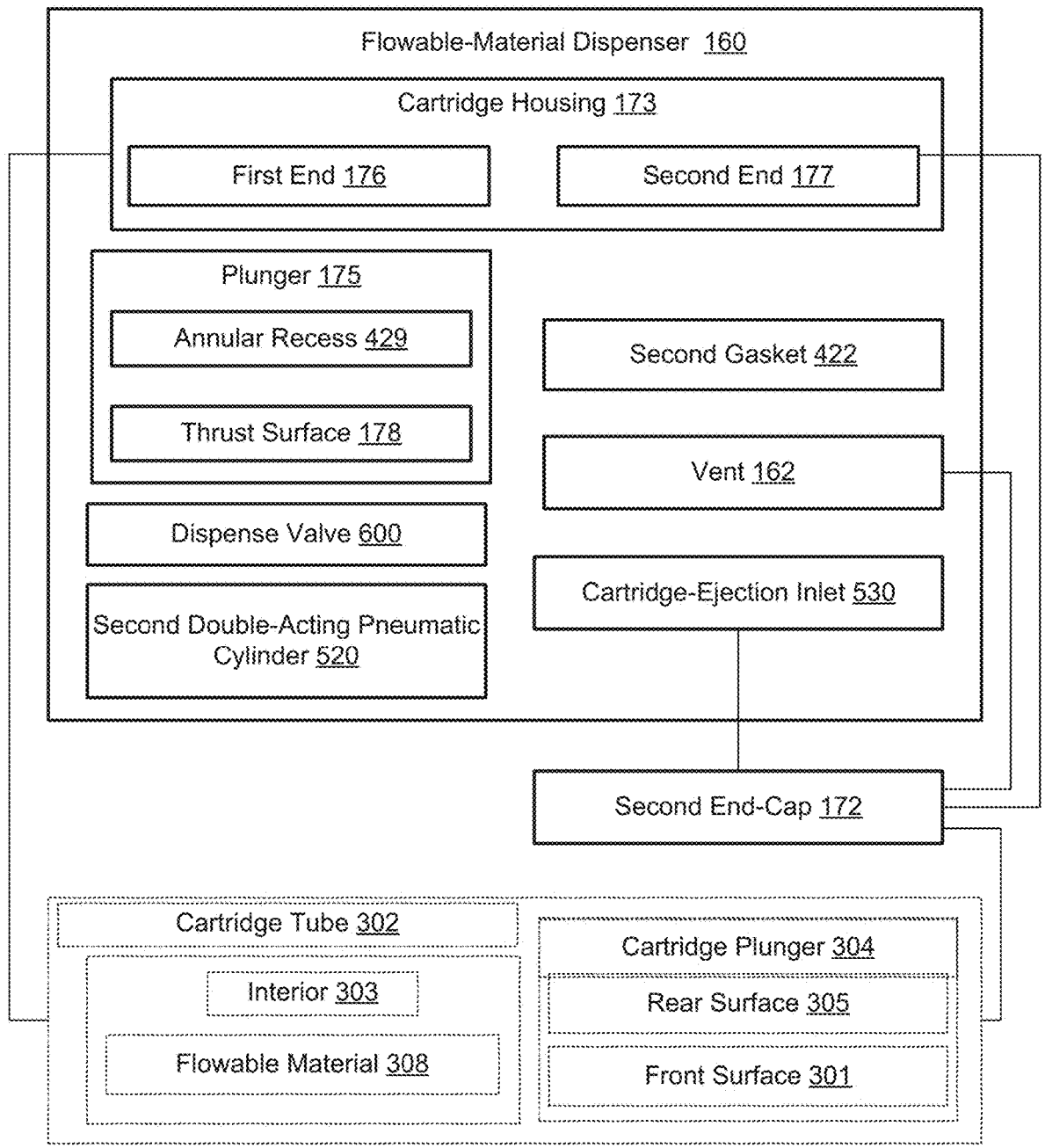
Figure 2:
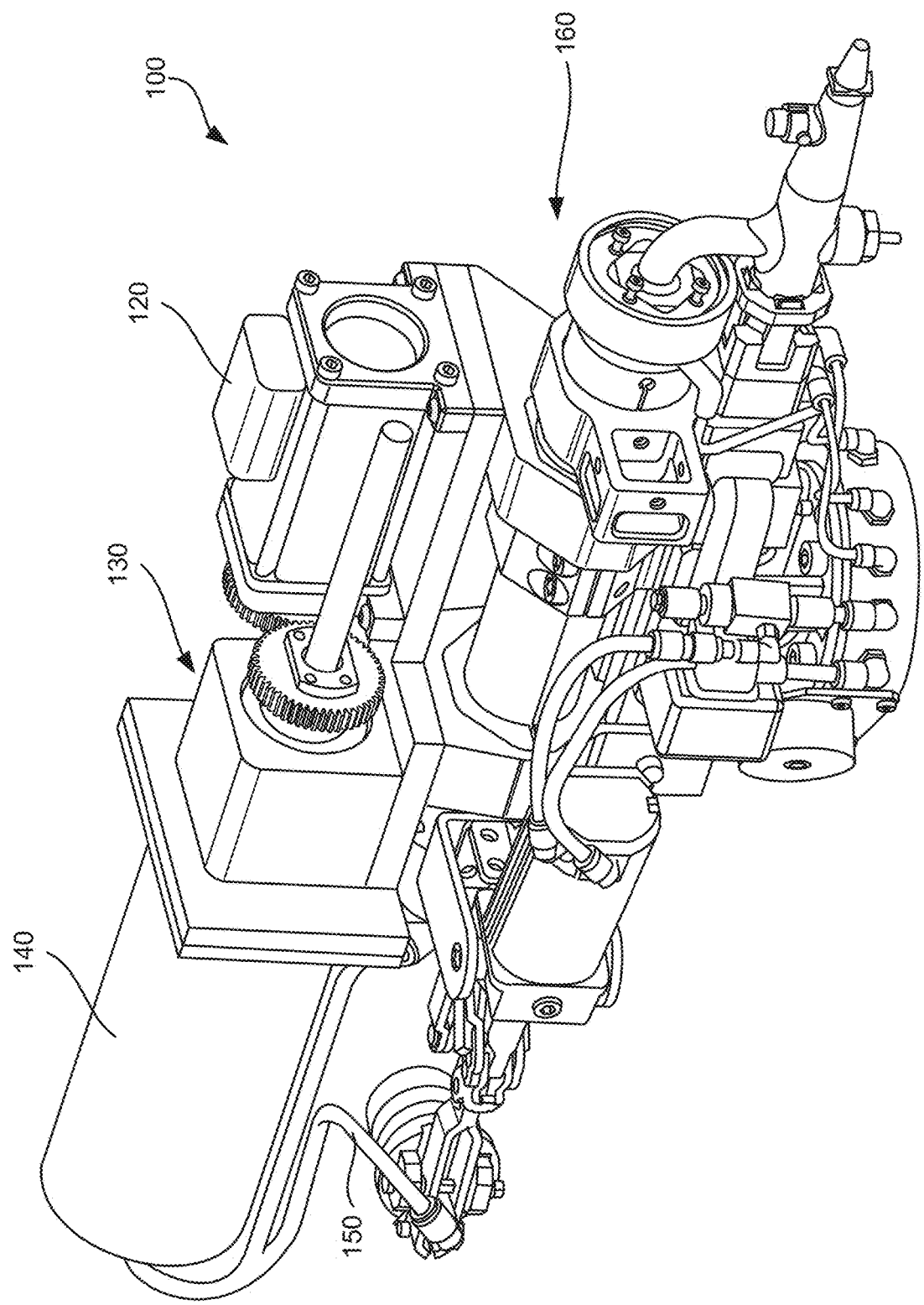
Figure 3A:
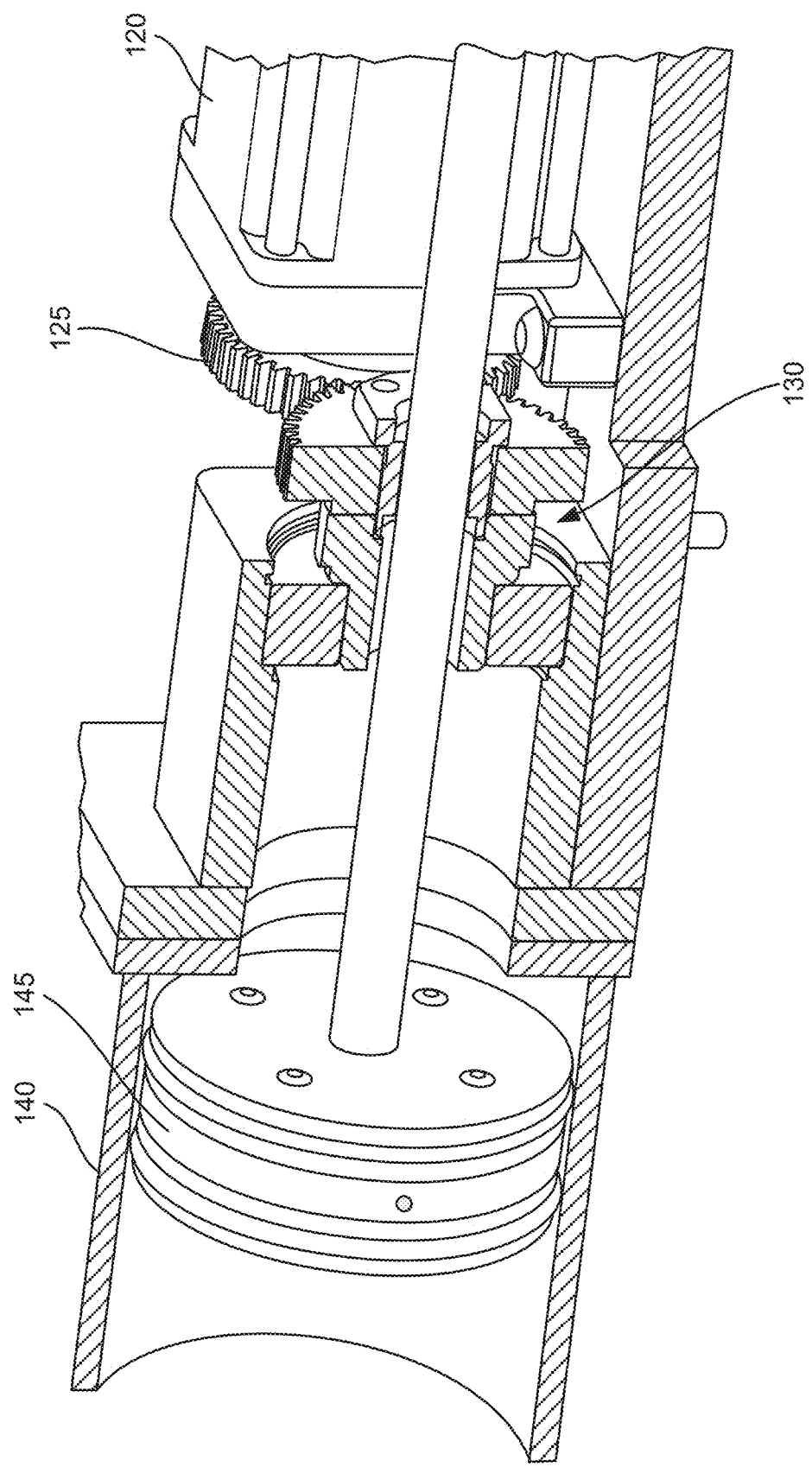
Figure 3B:
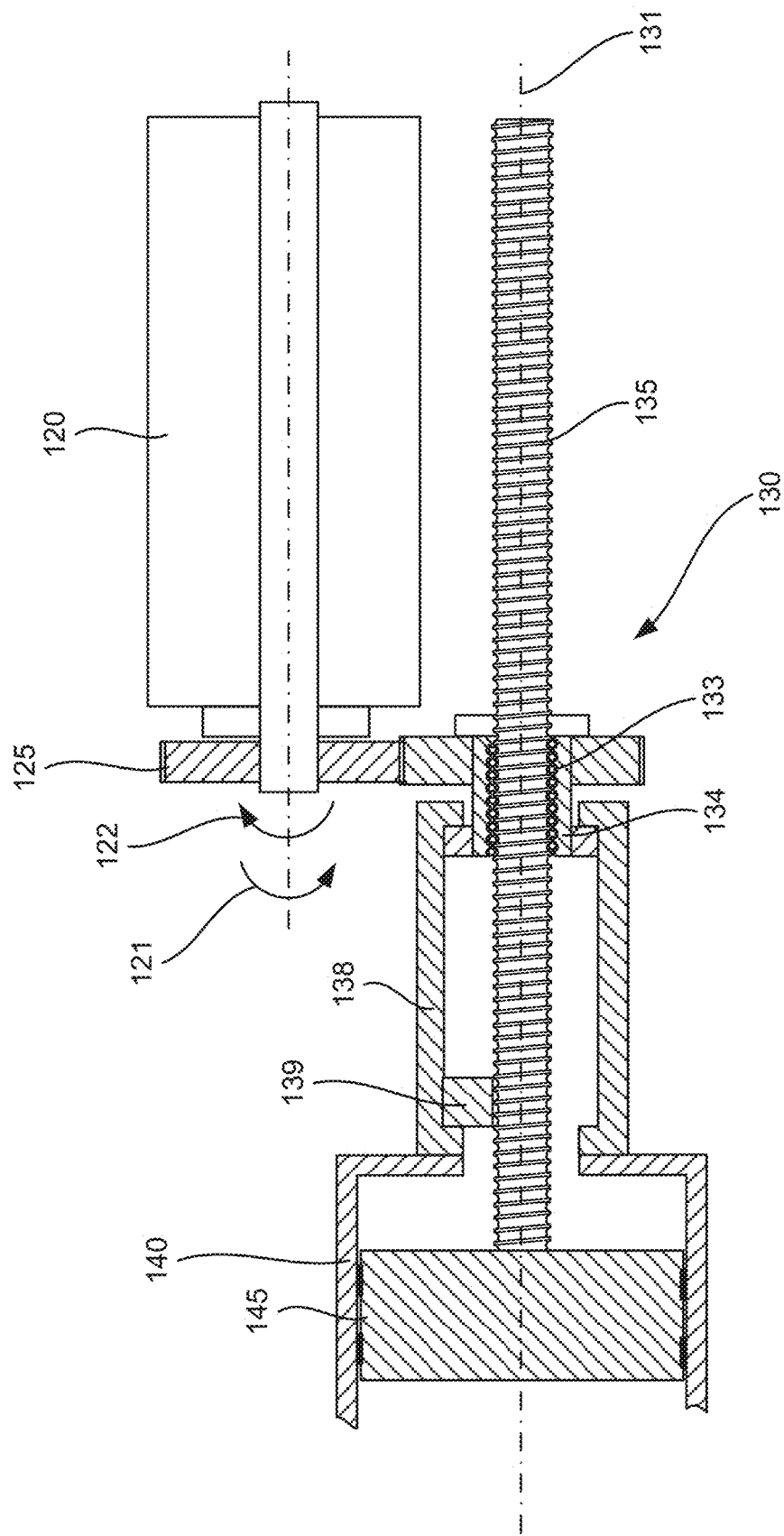
Figure 3E:
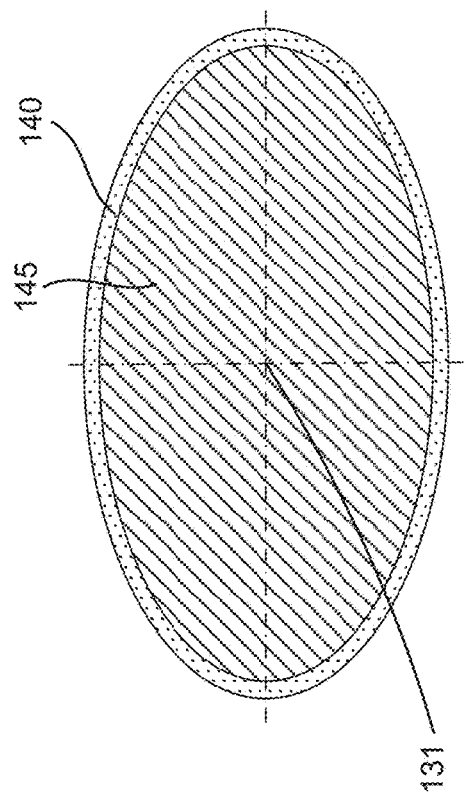
Figure 3F:
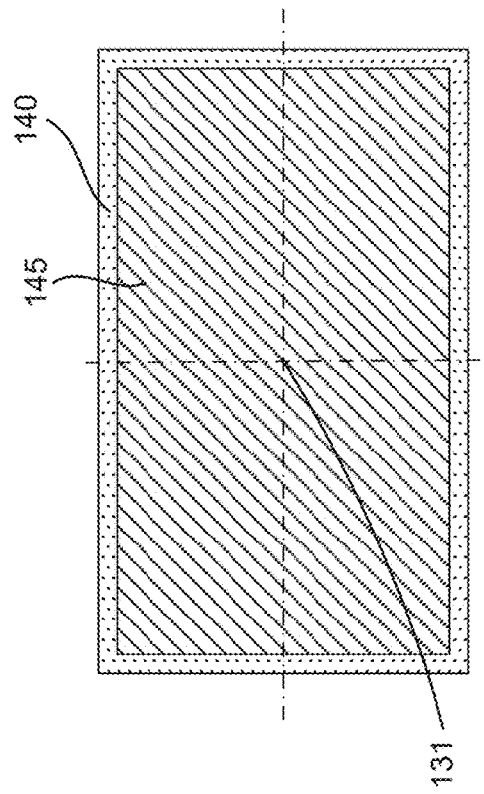
Figure 3C:
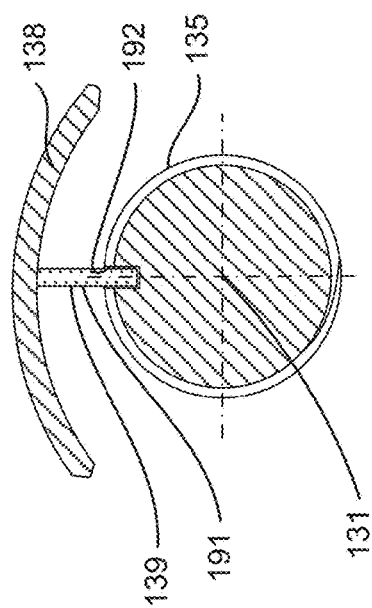
Figure 3D:
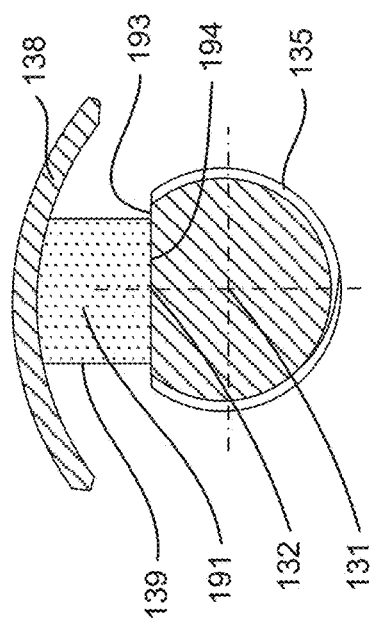
Figure 4A:
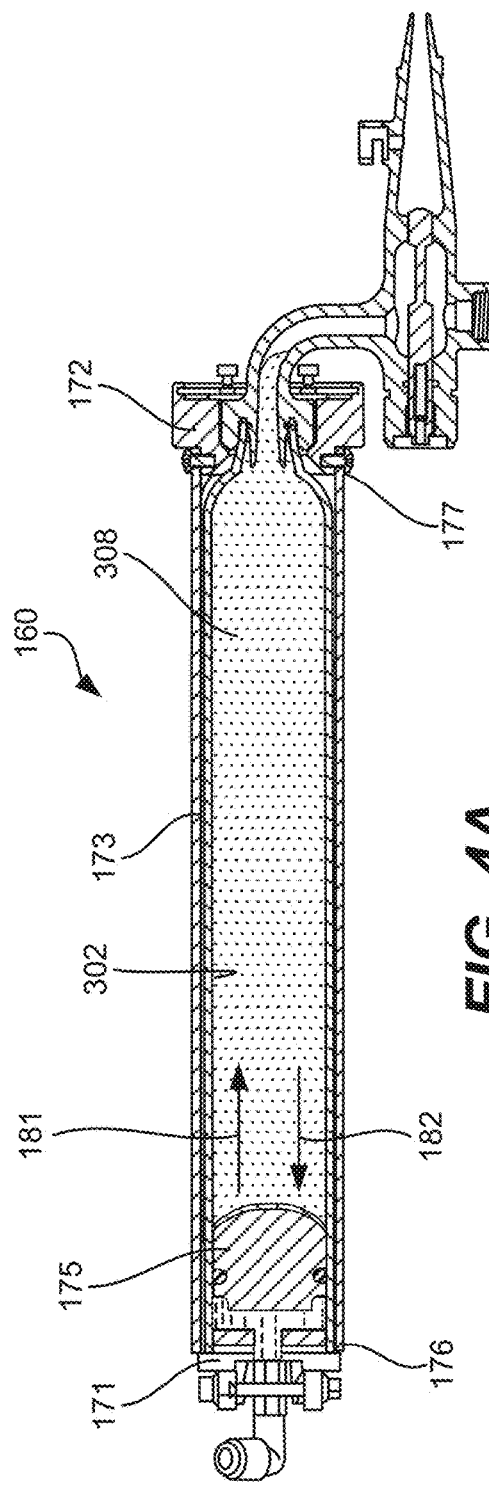
Figure 4B:
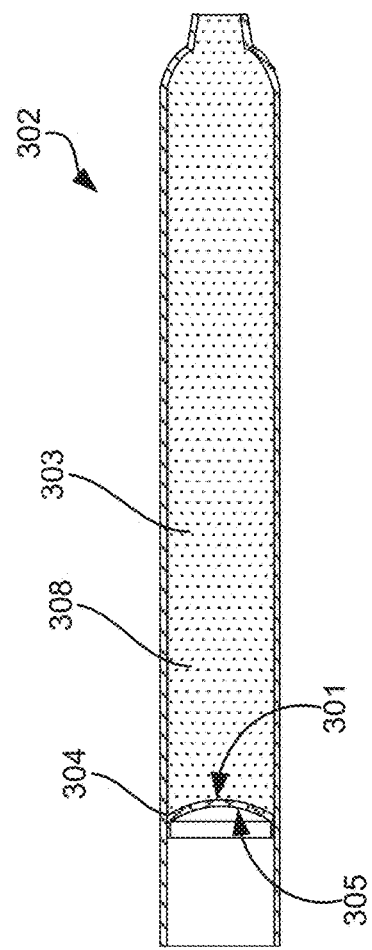
Figure 4C:
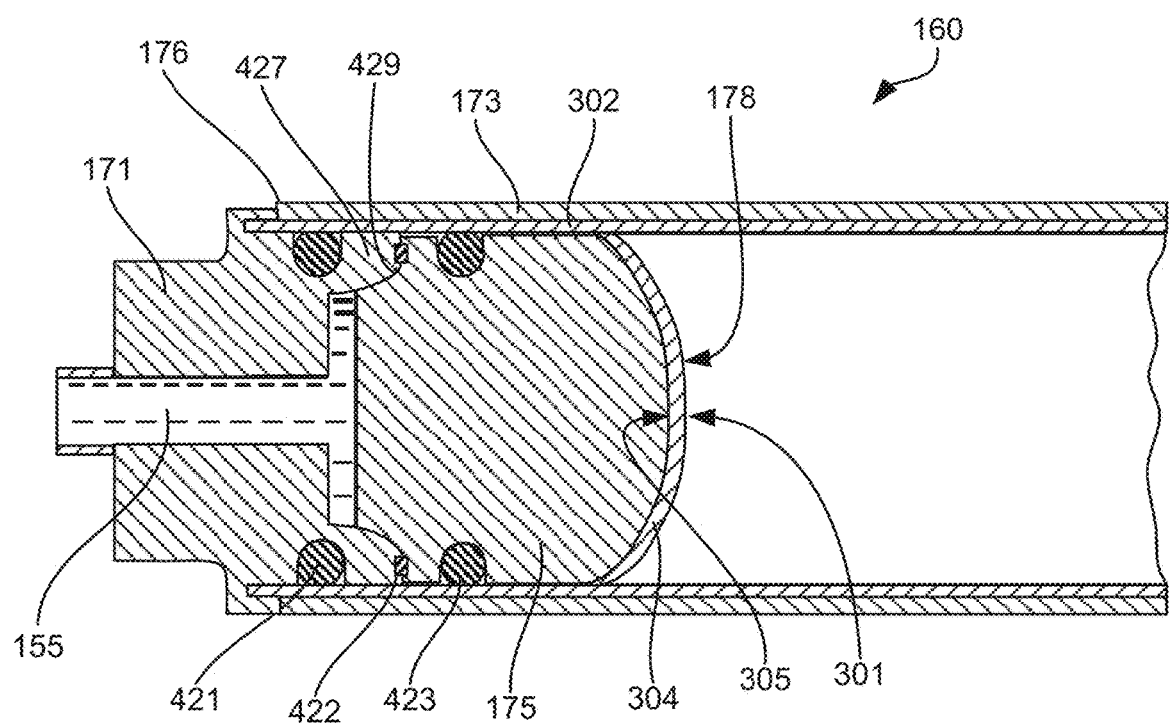
Figure 4D:
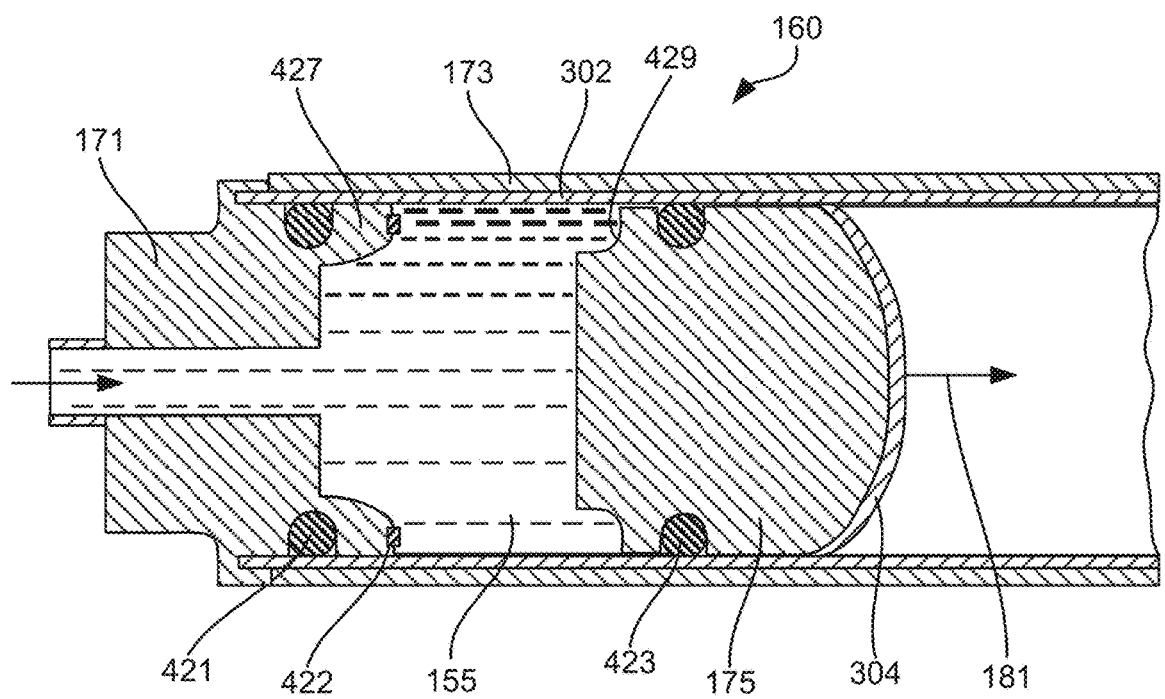
Figure 4E:
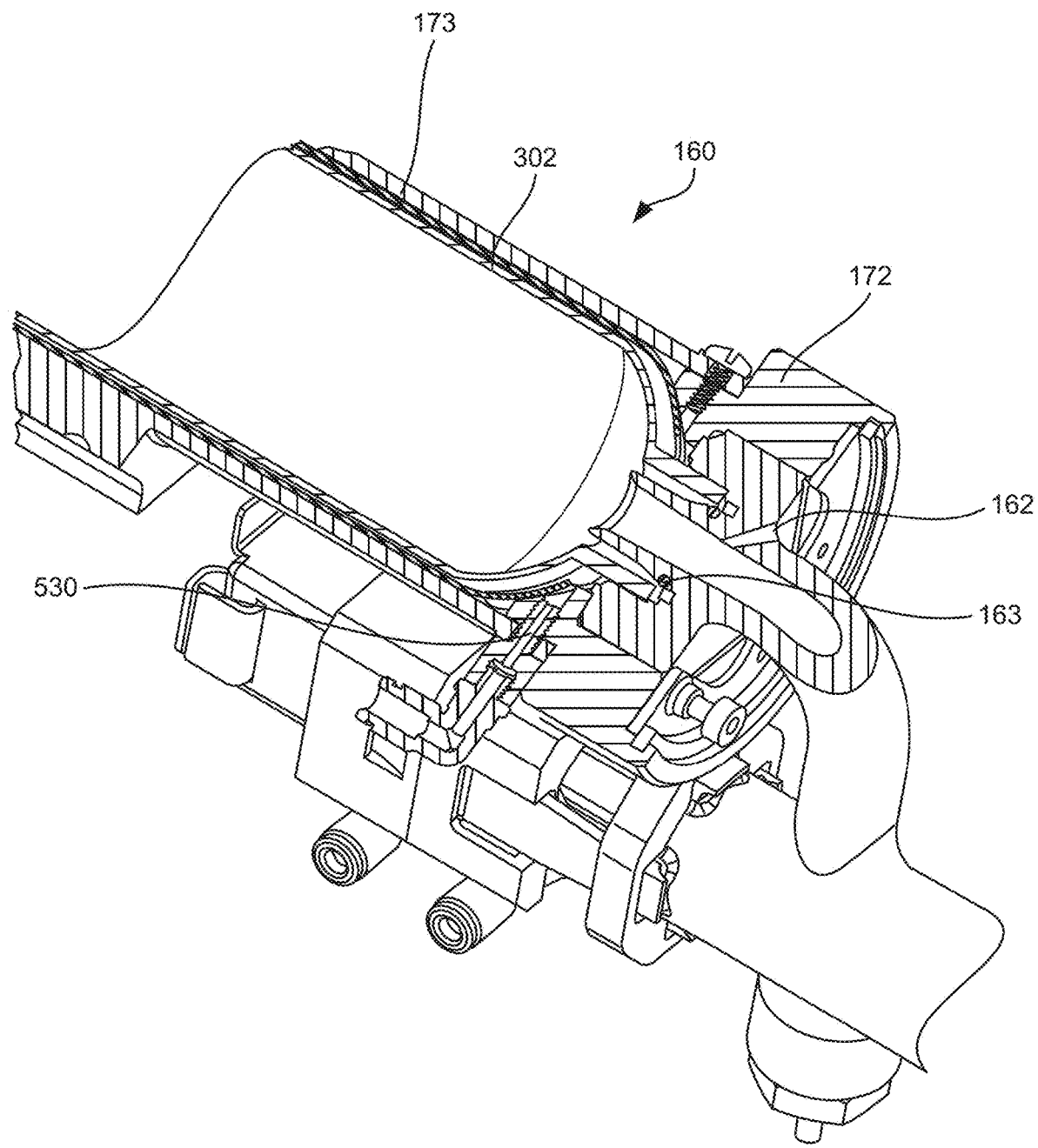
Figure 5A:
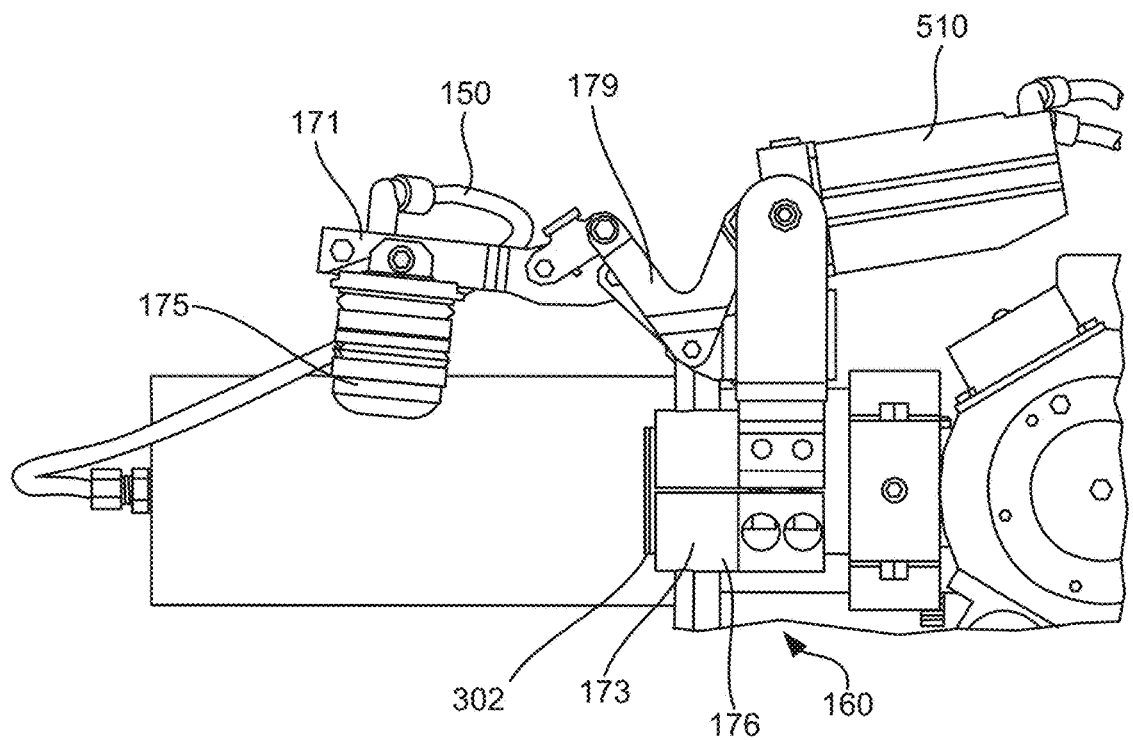
Figure 5B:
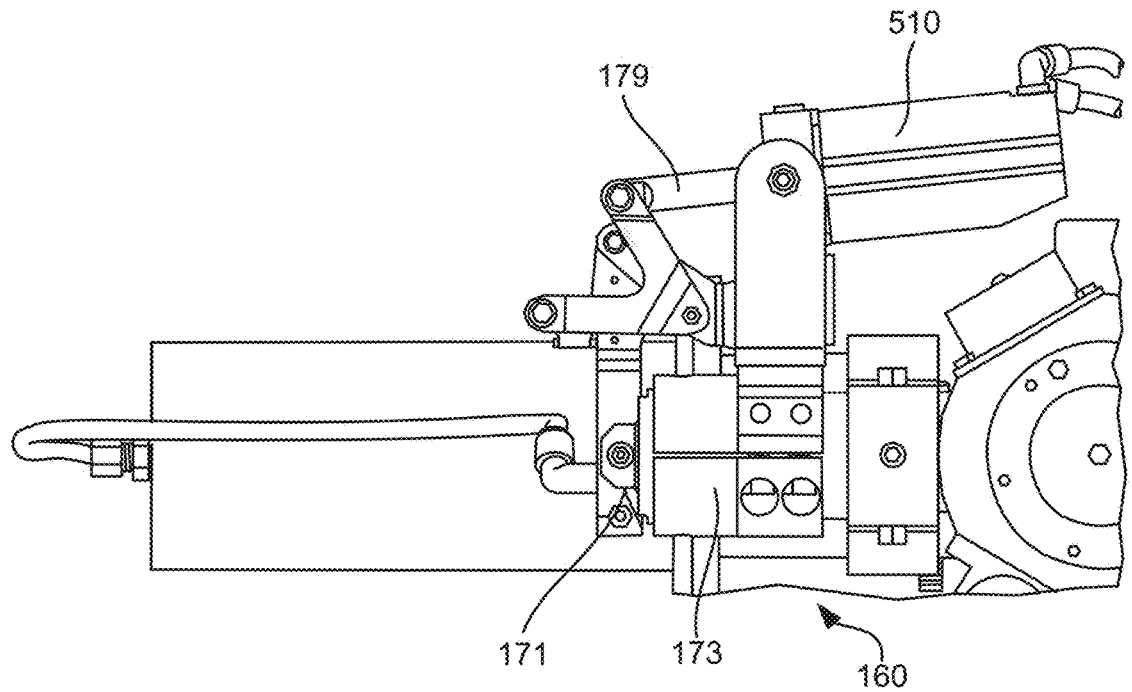
Figure 6A:
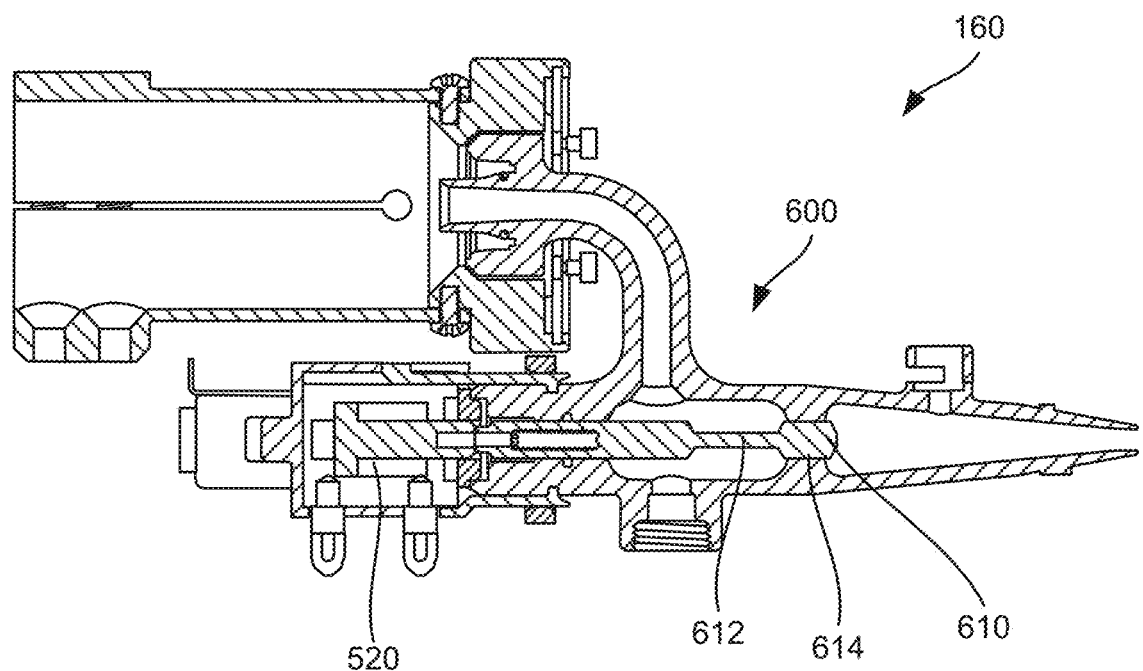
Figure 6B:
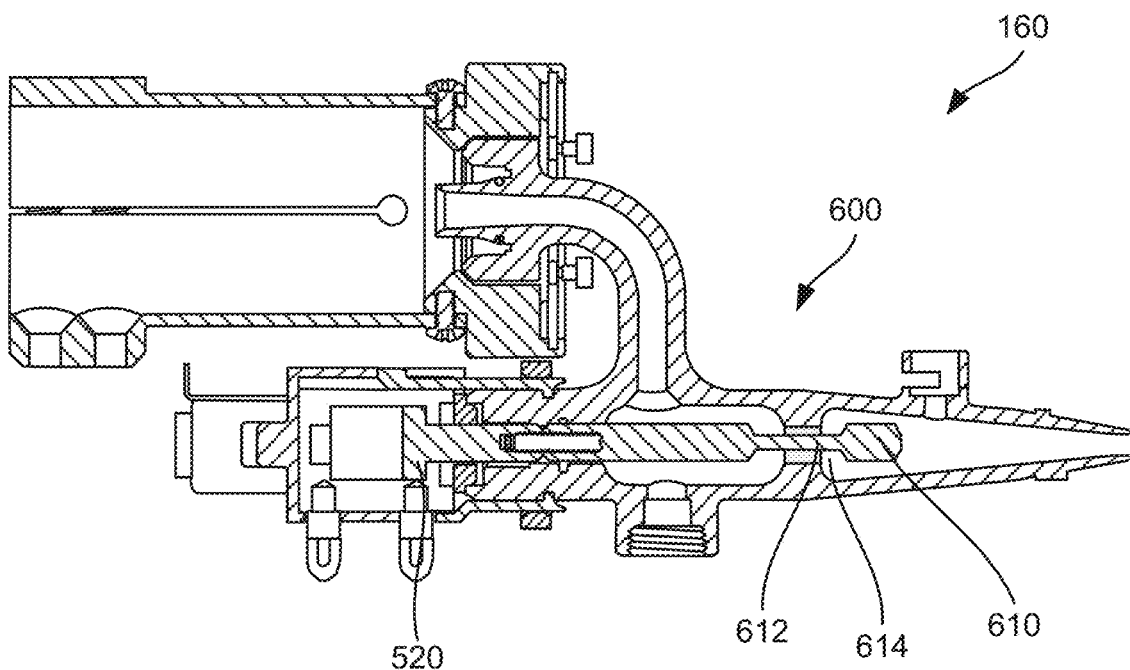
Figure 7A:
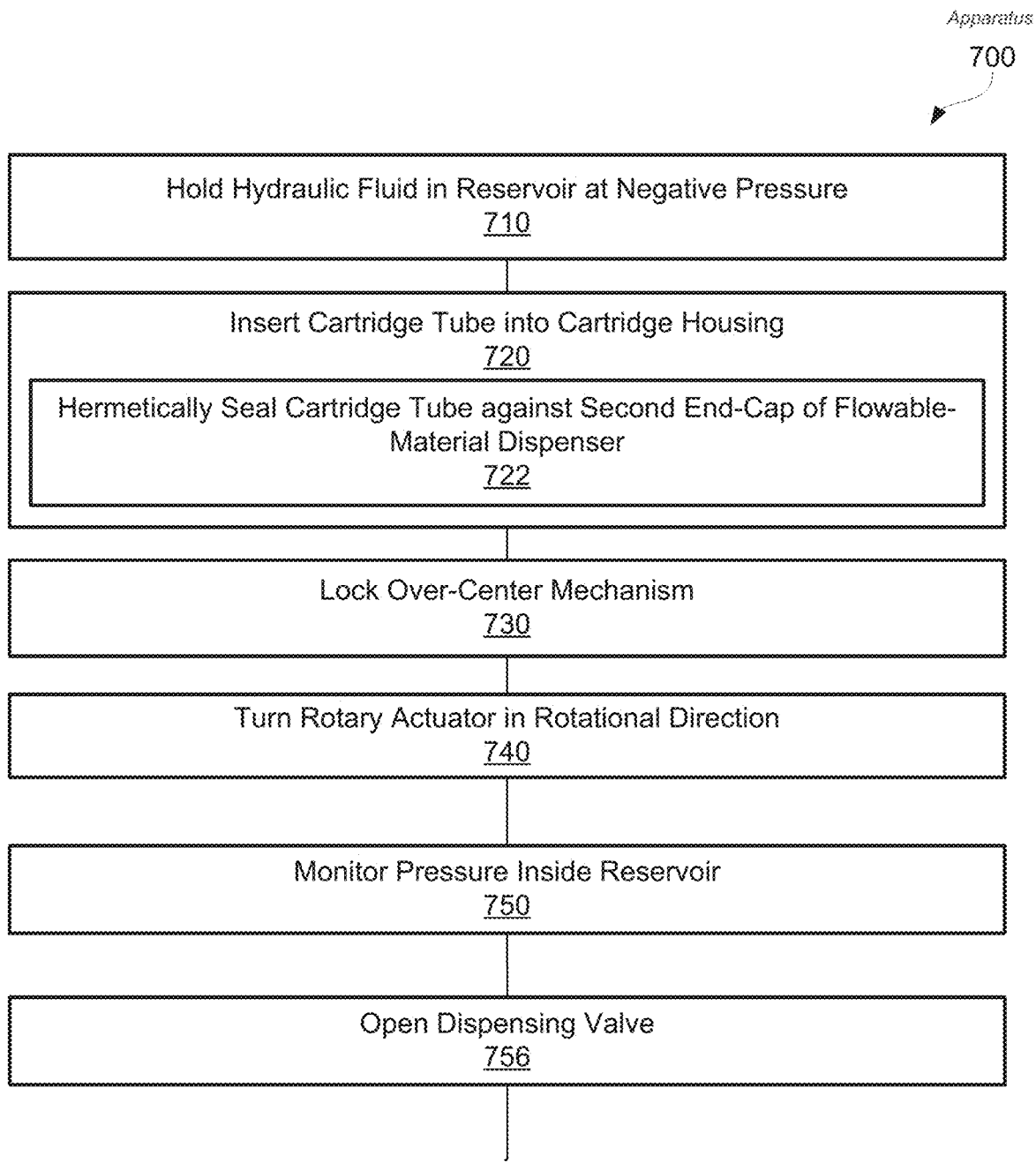
Figure 8A:
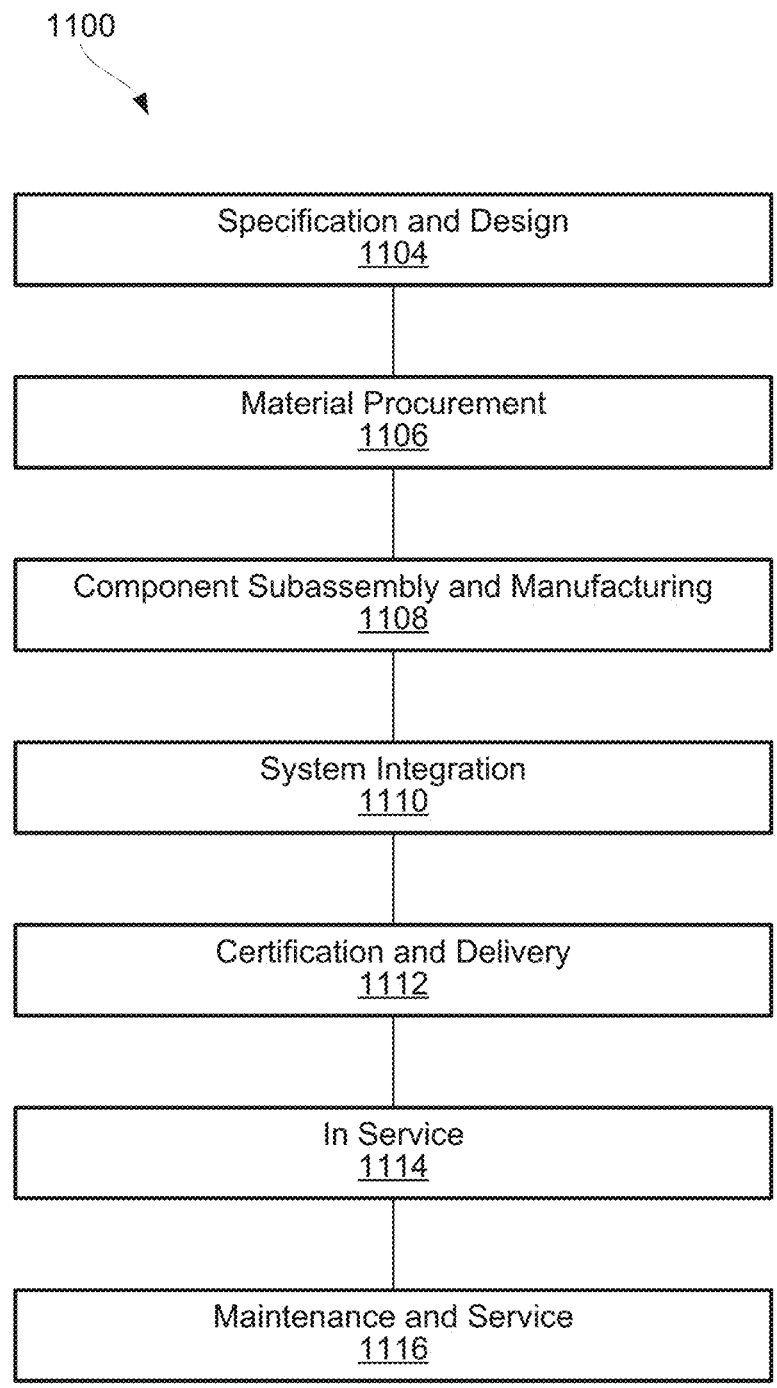

Having thus described one or more examples of the present disclosure in general terms, reference will now be made to the accompanying drawings, which are not necessarily drawn to scale, and wherein like reference characters designate the same or similar parts throughout the several views, and wherein:

FIGS. 1A and 1B, collectively, are a block diagram of an apparatus for dispensing flowable materials, according to one or more examples of the present disclosure;

FIG. 2 is a schematic perspective view of the apparatus of FIGS. 1A and 1B, according to one or more examples of the present disclosure;

FIGS. 3A and 3B are schematic cross-sectional views of a portion of the apparatus of FIG. 2, according to one or more examples of the present disclosure;

FIGS. 3C and 3D are schematic cross-sectional views of an anti-rotation mechanism of the apparatus of FIGS. 1A and 1B, according to one or more examples of the present disclosure;

FIGS. 3E and 3F are schematic cross-sectional views of a piston and a reservoir of the apparatus of FIGS. 1A and 1B, according to one or more examples of the present disclosure;

FIG. 4A is a schematic cross-sectional view of a flowable-material dispenser of the apparatus of FIG. 2, illustrating a cartridge tube inserted into the cartridge housing, according to one or more examples of the present disclosure;

FIG. 4B is a schematic cross-sectional view of the cartridge tube of FIG. 4A, according to one or more examples of the present disclosure;

FIG. 4C is a schematic cross-sectional view of a portion of the flowable-material dispenser in FIG. 4A, illustrating a plunger positioned against an end-cap, according to one or more examples of the present disclosure;

FIG. 4D is a schematic cross-sectional view of the portion of the flowable-material dispenser also shown in FIG. 4B, illustrating the plunger moving away from the end-cap, according to one or more examples of the present disclosure;

FIG. 4E is a schematic cross-sectional view of a portion of the flowable-material dispenser in FIG. 4A, illustrating a cartridge tube sealed against a second end-cap, according to one or more examples of the present disclosure;

FIGS. 5A and 5B are schematic side views of a portion of the apparatus in FIG. 2, illustrating operation of an over-center mechanism, according to one or more examples of the present disclosure;

FIGS. 6A and 6B are schematic cross-sectional views of a portion of the flowable-material dispenser in FIG. 4A, illustrating operation of a dispenser valve, according to one or more examples of the present disclosure;

FIGS. 7A and 7B, collectively, are a block diagram of a method of dispensing flowable material using the apparatus of FIGS. 1A, 1B, and 2, according to one or more examples of the present disclosure;

FIG. 8A is a block diagram of aircraft production and service methodology; and

Figure 8B:
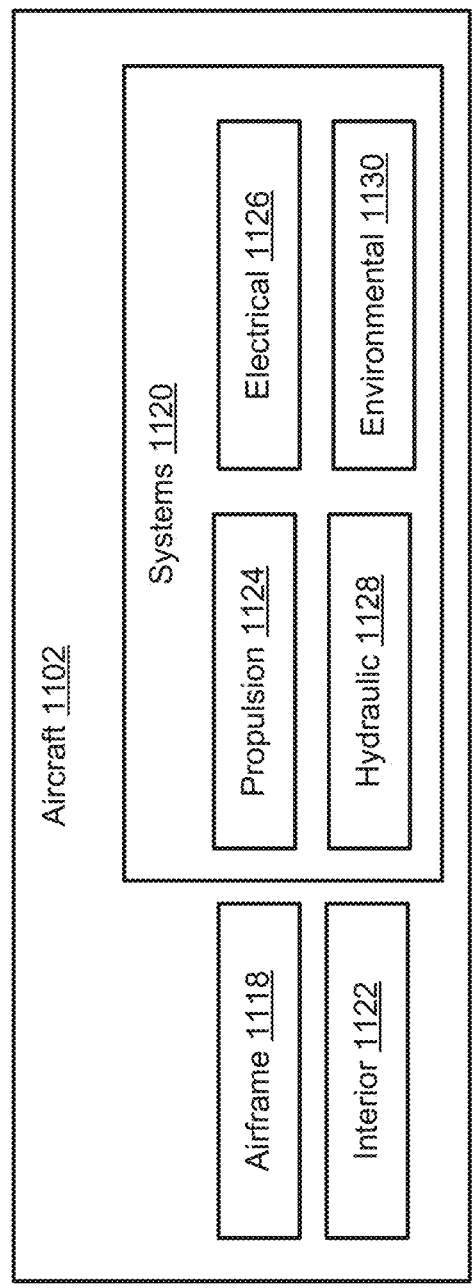

FIG. 8B is a schematic illustration of an aircraft.

DETAILED DESCRIPTION

In FIGS. 1A and 1B, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1A, 1B, and 1C may be combined in various ways without the need to include other features described in FIGS. 1A, 1B, and 1C, other drawing figures, and/or the accompanying disclosure, even though such combination or combinations are not explicitly illustrated herein. Similarly, additional features not limited to the examples presented, may be combined with some or all of the features shown and described herein.

In FIGS. 8A and 8B, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 8A and 8B and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIGS. 1A and 1B, and particularly to, e.g., FIGS. 2, 3A, 3B, and 4D, apparatus 100 for dispensing flowable material 308 is disclosed. Apparatus 100 comprises rotary actuator 120, reservoir 140, containing hydraulic fluid 155, and piston 145, movable inside reservoir 140. Apparatus 100 also comprises linear actuator 130, coupled to piston 145, gear train 125, coupling rotary actuator 120 with linear actuator 130, and flowable-material dispenser 160, hydraulically coupled with reservoir 140. The preceding subject matter of this paragraph characterizes example 1 of the present disclosure.

Using rotary actuator 120 and direct mechanical or hydraulic coupling between various components of apparatus 100 provides high dispensing precision. Specifically, the linear movement of piston 145 inside reservoir 140, containing hydraulic fluid 155, is precisely controlled by rotary actuator 120, such as a stepper motor. Rotary actuator 120 is coupled to linear actuator 130 using gear train 125, while linear actuator 130 is coupled to piston 145. The linear movement of piston 145 transfers at least a portion of hydraulic fluid 155 between reservoir 140 and flowable-material dispenser 160. Hydraulic fluid 155, transferred to flowable-material dispenser 160, displaces flowable material 308 from flowable-material dispenser 160 in a precise manner. It should be noted that the volume of hydraulic fluid 155, displaced from reservoir 140, is the same as the volume of hydraulic fluid 155 received in flowable-material dispenser 160 since hydraulic fluid 155 is not compressible. As such, the dispensing of flowable material 308 is precisely controlled by the movement of piston 145 inside reservoir 140, which in turn is precisely controlled by rotary actuator 120. Overall, rotary actuator 120 controls precise dispensing of flowable material 308 through mechanical and hydraulic coupling between various components of apparatus 100. Furthermore, the hydraulic coupling allows more flexible positioning of flowable-material dispenser 160 relative to rotary actuator 120, thereby resulting in apparatus 100 being compact. FIG. 2 illustrates an example of flowable-material dispenser 160 and rotary actuator 120 being positioned along two parallel axes.

Apparatus 100 is configured to dispense various types of flowable materials 308. Some examples of flowable materials 308 include, but are not limited to, adhesives, sealants, lubricants, viscous materials, thixotropic materials, and the like. In some examples, the viscosity of flowable materials 308 is between about 10,000 cps and 1,000,000 cps or, more specifically, between about 50,000 cps and 250,000 cps. High viscosity and other flow characteristics of flowable materials 308 require high displacement forces, which interferes with precision of conventional methods. On the other hand, hydraulic coupling between different components of apparatus 100 allows generating high displacement forces without compromising displacement precision.

Some examples of rotary actuator 120 include, but are not limited to, stepper motors, servo motors, and the like. The rotational speed and degree of rotation (e.g., the rotational angle and/or the number of rotations) of rotary actuator 120 is precisely controlled. As further described below, various inputs, e.g., pressure inside reservoir 140, are used for controlling rotary actuator 120. The rotational speed controls the dispensing rate (e.g., the flow rate) of flowable material 308 from apparatus 100. The degree of rotation controls the amount of flowable material 308 dispensed from apparatus 100.

Precision of the dispensing rate and/or the dispensed amount of flowable material 308 is also enhanced by gear train 125 and/or linear actuator 130. In some examples, gear train 125 provides a rotation speed reduction from rotary actuator 120 and linear actuator 130 thereby increasing the precision of linear actuator 130. In these examples, the gear ratio is between about 1.5 and 30 and, more specifically, between about 2 and 10. The gear ratio is defined as a ratio of the number of teeth on an input gear, coupled to rotary actuator 120, to the number of teeth on an output gear, coupled to linear actuator 130.

Referring generally to FIGS. 1A and 1B, and particularly to, e.g., FIGS. 4A-4E, flowable-material dispenser 160 comprises cartridge housing 173 and plunger 175. Cartridge housing 173 has first end 176 and second end 177, opposite first end 176. Cartridge housing 173 is configured to receive cartridge tube 302, having interior 303, filled with flowable material 308. Plunger 175 is selectively translatable within cartridge tube 302 once cartridge tube 302 is received in cartridge housing 173 and plunger 175 is received within cartridge tube 302. The preceding subject matter of this paragraph characterizes example 2 of the present disclosure, wherein example 2 also includes the subject matter according to example 1, above.

Cartridge housing 173 receives and encloses cartridge tube 302. Furthermore, cartridge housing 173 supports cartridge tube 302 while flowable material 308 is dispensed from cartridge tube 302. During dispensing, plunger 175 is positioned within interior 303 of cartridge tube 302 and hydraulically forced to translate from first end 176 to second end 177. As plunger 175 translates from first end 176 to second end 177, plunger 175 displaces flowable material 308 from cartridge tube 302 at second end 177 of cartridge housing 173. The controlled rotation of rotary actuator 120 causes plunger 175 to translate within cartridge tube 302 because of the hydraulic coupling between reservoir 140 and flowable-material dispenser 160. The precision and control of rotary actuator 120 translates into precise and controlled dispensing of flowable material 308.

In one or more examples, the length of cartridge housing 173, between first end 176 and second end 177, corresponds to the length of cartridge tube 302. When cartridge tube 302 is inserted into cartridge housing 173, the leading end of cartridge tube 302 is sealed against second end-cap 172 of apparatus 100. Second end-cap 172 is positioned at second end 177 of cartridge housing 173. In a similar manner, the lagging end of cartridge tube 302 is sealed against end-cap 171 of apparatus 100, positioned at first end 176 of cartridge housing 173.

In one or more examples, the inside diameter of cartridge housing 173 corresponds to the outside diameter of cartridge tube 302. As a result, cartridge tube 302 snuggly fits inside cartridge housing 173. In these examples, the wall of cartridge housing 173 supports the wall of cartridge tube 302 when the hydraulic pressure is applied to plunger 175 and also to the walls of cartridge tube 302, either directly by hydraulic fluid 155 or by flowable material 308. This feature allows using cartridge tube 302 with a thin wall and/or applying high hydraulic pressures (e.g., to dispense particularly viscous materials and/or dispense at high rates).

Referring generally to FIGS. 1A and 1B, and particularly to, e.g., FIGS. 2, 3A, 3B, and 4A-4D, plunger 175 is translatable within cartridge tube 302 responsive to motion of piston 145 inside reservoir 140. The motion of piston 145 inside reservoir 140 transfers hydraulic fluid 155 between reservoir 140 and cartridge housing 173 of flowable-material dispenser 160. The preceding subject matter of this paragraph characterizes example 3 of the present disclosure, wherein example 3 also includes the subject matter according to example 2, above.

The hydraulic coupling between reservoir 140 and cartridge tube 302 enables the position of plunger 175 in cartridge tube 302 to be controlled with piston 145 inside reservoir 140, which in turn is controlled by rotary actuator 120. Specifically, the volume of hydraulic fluid 155 displaced from reservoir 140 (due to the motion of piston 145 inside reservoir 140) is the same as the volume of hydraulic fluid 155 received in cartridge tube 302 since hydraulic fluid 155 is not compressible. This volume of hydraulic fluid 155 received in cartridge tube 302 pushes plunger 175 from first end 176 and second end 177.

A process of retraction of plunger 175 from cartridge tube 302 is similar. The volume of hydraulic fluid 155 received into reservoir 140 due to the motion of piston 145 inside reservoir 140 is the same as the volume of hydraulic fluid 155 transferred from cartridge tube 302. This removal of hydraulic fluid 155 from cartridge tube 302 between plunger 175 and first end 176 creates a negative pressure in hydraulic fluid 155, which applies a force to plunger 175 toward first end 176. As a result of this negative pressure, plunger 175 is pushed from second end 177 to first end 176.

The translation distance of plunger 175 is proportional to the volume of hydraulic fluid 155, transferred into or from cartridge tube 302. Specifically, the translation distance of plunger 175 is equal to the ratio of the volume of hydraulic fluid 155, transferred into or from cartridge tube 302, to the cross-sectional area of interior 303 of cartridge tube 302. As described above, the volume of hydraulic fluid 155 transferred to or from cartridge tube 302 is the same as the volume of hydraulic fluid 155 transferred from or to reservoir 140. Furthermore, the volume of hydraulic fluid 155 transferred to from cartridge tube 302 is the same as the volume of flowable material 308 dispensed by apparatus 100, assuming that flowable material 308 and plunger 175 are not compressible. This transferred volume is controlled by rotary actuator 120 via gear train 125 and linear actuator 130.

In one or more examples, plunger 175 is translatable within cartridge tube 302 while being sealed against the interior surface of cartridge tube 302. For example, plunger 175 is formed from an elastomeric material (e.g., rubber). A portion of plunger 175 is in direct contact with hydraulic fluid 155. In one or more examples, this portion of plunger 175 is always in direct contact with hydraulic fluid 155.

Referring generally to FIGS. 1A and 1B, and particularly to, e.g., FIGS. 2, 4A, 4C, 4D, 5A, and 5B, apparatus 100 further comprises end-cap 171, movably coupled with flowable-material dispenser 160 at first end 176 of cartridge housing 173, hydraulically coupled with reservoir 140, and configured to selectively sealingly engage interior 303 of cartridge tube 302 when cartridge tube 302 in received within cartridge housing 173 of flowable-material dispenser 160. The preceding subject matter of this paragraph characterizes example 4 of the present disclosure, wherein example 4 also includes the subject matter according to example 2 or 3, above.

When end-cap 171 seals against interior 303 of cartridge tube 302, a combination of end-cap 171, plunger 175, and cartridge tube 302 defines the volume of hydraulic fluid 155 within interior 303 of cartridge tube 302. As described above, when hydraulic fluid 155 is transferred into cartridge tube 302, this volume increases. Specifically, hydraulic fluid 155 translates plunger 175 away from end-cap 171. On the other hand, when hydraulic fluid 155 is transferred back in reservoir 140, this volume decreases. During this operation, hydraulic fluid 155 is at a negative pressure and pulls plunger 175 within cartridge tube 302 toward end-cap 171.

End-cap 171 is movably coupled to flowable-material dispenser 160. In one position, shown in FIGS. 4A, 4C, 4D, and 5B, end-cap 171 sealingly engages interior 303 of cartridge tube 302. In this position, plunger 175 is disposed within cartridge tube 302 and is translatable within cartridge tube 302 by flowing hydraulic fluid 155 through end-cap 171. In another position, shown in FIG. 5A, end-cap 171 is positioned away from first end 176 of cartridge housing 173. In this position, cartridge housing 173 is accessible to remove or install cartridge tube 302 inside cartridge housing 173.

The seal between end-cap 171 and interior 303 of cartridge tube 302 ensures that hydraulic fluid 155 stays within interior 303 of cartridge tube 302 and does not leak from cartridge tube 302 into cartridge housing 173. The seal is maintained while end-cap 171 is positioned at first end 176 of cartridge housing 173. The seal is broken when end-cap 171 is moved away from first end 176 of cartridge housing 173 as shown, for example, in FIG. 5A.

Referring generally to FIGS. 1A and 1B, and particularly to, e.g., FIGS. 4A, 4C, and 4D, end-cap 171 comprises first gasket 421, configured to selectively seal against interior 303 of cartridge tube 302 when cartridge tube 302 is received within cartridge housing 173. The preceding subject matter of this paragraph characterizes example 5 of the present disclosure, wherein example 5 also includes the subject matter according to example 4, above.

First gasket 421 is sealed against interior 303 of cartridge tube 302 to ensure that hydraulic fluid 155 stays within cartridge tube 302 and does not leak out of cartridge tube 302, e.g., into cartridge housing 173. As hydraulic fluid 155 is supplied into cartridge tube 302, plunger 175 translates from first end 176 to second end 177 of cartridge housing 173 and displaces flowable material 308 from cartridge tube 302. Preventing loss of hydraulic fluid 155 from cartridge tube 302 ensures dispensing precision.

Referring to FIGS. 4C and 4D, in one or more examples, first gasket 421 is an O-ring. In the same or other examples, first gasket 421 is positioned in a channel of end-cap 171. The outer diameter of first gasket 421 is greater than the inner diameter of cartridge tube 302, which provides interference fit and sealing. In one or more examples, first gasket 421 is formed from art elastomeric material (e.g., rubber).

Referring generally to FIGS. 1A and 1B, and particularly to, e.g., FIGS. 4C and 4D, flowable-material dispenser 160 further comprises second gasket 422, configured to seal end-cap 171 against plunger 175 when a sufficient amount of hydraulic fluid 155 is transferred from cartridge housing 173 to reservoir 140 to cause plunger 175 to abut end-cap 171 and an additional amount of hydraulic fluid 155 is subsequently transferred from cartridge housing 173 to reservoir 140. The preceding subject matter of this paragraph characterizes example 6 of the present disclosure, wherein example 6 also includes the subject matter according to example 5, above.

Second gasket 422 forms a seal between plunger 175 and end-cap 171, which in turn allows creating a negative pressure (relative to the atmosphere) in hydraulic fluid 155. This negative pressure forces plunger 175 against end-cap 171 allowing, for example, removal of plunger 175 from cartridge tube 302. Furthermore, this negative pressure supports plunger 175 on end-cap 171 after plunger 175 is removed from cartridge tube 302.

In one or more examples, second gasket 422 is attached to end-cap 171, as shown in FIG. 4D. For example, second gasket 422 is glued to a surface of end-cap 171 or positioned in a groove formed in end-cap 171. Second gasket 422 protrudes from the surface of end-cap 171 and, in one or more examples, directly contacts plunger 175 when plunger 175 is supported by end-cap 171. Alternatively, second gasket 422 is a part of or is attached to plunger 175. In one or more examples, second gasket 422, shown in FIG. 4D, is formed from an elastomeric material (e.g., rubber).

Referring generally to FIGS. 1A and 1B, and particularly to, e.g., FIGS. 4C and 4D, end-cap 171 further comprises annular boss 427. Plunger 175 comprises annular recess 429. Annular boss 427 and annular recess 429 have complementary shapes. The preceding subject matter of this paragraph characterizes example 7 of the present disclosure, wherein example 7 also includes the subject matter according to example 5 or 6, above.

Inserting annular boss 427 of end-cap 171 into annular recess 429 of plunger 175 provides interference fit and/or frictional fit between end-cap 171 and plunger 175. This fit provides support to plunger 175 relative to end-cap, in addition to or instead of support provided by the negative pressure of hydraulic fluid 155, as described above. Furthermore, a combination of annular boss 427 of end-cap 171 and annular recess 429 of plunger 175 is used to control orientation of plunger 175 relative to end-cap 171 when plunger 175 is extracted from cartridge tube 302. This orientation control allows removal of plunger 175 from end-cap 171 and reinstallation of plunger 175 onto end-cap 171, e.g., during initial assembly of apparatus 100, cleaning and maintenance of apparatus 100, and other like tasks.

In one or more examples, annular boss 427 comprises a fillet or a chamfer for directing and/or centering annular recess 429 relative to annular boss 427. Likewise, in one or more examples, annular recess 429 comprises a fillet or a chamfer for locating annular boss 427 relative to annular recess 429 and for guiding the rest of annular boss 427 into annular recess 429.

Referring generally to FIGS. 1A and 1B, and particularly to, e.g., FIGS. 4C and 4D, apparatus 100 further comprises second gasket 422 between annular boss 427 of end-cap 171 and annular recess 429 of plunger 175. The preceding subject matter of this paragraph characterizes example 8 of the present disclosure, wherein example 8 also includes the subject matter according to example 7, above.

Second gasket 422 forms a seal between plunger 175 and end-cap 171, which in turn allows creating a negative pressure (relative to the atmosphere) in hydraulic fluid 155. This negative pressure creates a force, applied to plunger 175 against end-cap 171, which in turn allows removing plunger 175 from cartridge tube 302. The negative pressure is also used for supporting plunger 175 on end-cap 171, after plunger 175 is removed from cartridge tube 302. Annular boss 427 of end-cap 171 and annular recess 429 of plunger 175 have complementary shapes such that their mating surfaces contact each other when annular boss 427 is inserted into annular recess 429. Second gasket 422 establishes a seal between these mating surfaces.

In one or more examples, shown in FIG. 4D, second gasket 422 is attached to end-cap 171. For example, second gasket 422 is glued to a surface of end-cap 171 or is positioned in a groove formed in end-cap 171. Second gasket 422 protrudes from the surface of end-cap 171 and, in one or more examples, directly contacts plunger 175 when plunger 175 is supported by end-cap 171. In one or more examples, second gasket 422, shown in FIG. 4D, is formed from an elastomenic material (e.g., rubber).

Referring generally to FIGS. 1A and 1B, and particularly to, e.g., FIGS. 4C, 4D, 5A and 5B, apparatus 100 further comprises over-center mechanism 179, movably coupling end-cap 171 with cartridge housing 173 of flowable-material dispenser 160 and configured to selectively retain end-cap 171 relative to cartridge housing 173 such that end-cap 171 sealingly engages interior 303 of cartridge tube 302, received within cartridge housing 173, and to selectively remove end-cap 171 from cartridge tube 302, received within cartridge housing 173. The preceding subject matter of this paragraph characterizes example 9 of the present disclosure, wherein example 9 also includes the subject matter according to any one of examples 4 to 8, above.

Over-center mechanism 179 is attached to end-cap 171 and is used to move end-cap 171 relative to cartridge housing 173 between at least two positions. In one position, end-cap 171 is positioned at first end 176 of cartridge housing 173 and sealingly engages interior 303 of cartridge tube 302 as shown, for example, in FIG. 4C. In the other position, end-cap 171 is positioned away from cartridge housing 173 as shown, for example, in FIG. 5B. In this other position, first end 176 of cartridge housing 173 is accessible, which allows removing, replacing, and/or installing cartridge tube 302.

In some examples, over-center mechanism 179 is attached to and supported on cartridge housing 173. End-cap 171 is movable by over-center mechanism 179 relative to cartridge housing 173 as shown, for example, in FIGS. 5A and 5B. In some examples, over-center mechanism 179 comprises multiple arms pivotably coupled to each other. The number and the length of these arms establish the trajectory of end-cap 171 when end-cap 171 is moved by over-center mechanism 179 between at least the two positions of end-cap 171. In one or more examples, the movement of end-cap 171 relative to cartridge housing 173 is substantially along the center axis of cartridge housing 173 when end-cap 171 approaches first end 176 of cartridge housing 173. As described above, end-cap 171 supports plunger 175, and plunger 175 is inserted into cartridge tube 302 when end-cap 171 approaches first end 176 of cartridge housing 173.

Referring generally to FIGS. 1A and 1B, and particularly to, e.g., FIGS. 5A and 5B, apparatus 100 further comprises first double-acting pneumatic cylinder 510, operatively coupling over-center mechanism 179 with cartridge housing 173 of flowable-material dispenser 160. The preceding subject matter of this paragraph characterizes example 10 of the present disclosure, wherein example 10 also includes the subject matter according to example 9, above.

First double-acting pneumatic cylinder 510 is connected to and is used to move one end of over-center mechanism 179. The other end of over-center mechanism 179 is coupled to end-cap 171. This movement of first double-acting pneumatic cylinder 510 causes the movement of end-cap 171 relative to cartridge housing 173 between at least two positions, described above. First double-acting pneumatic cylinder 510 enables automation of this operation.

The force applied by first double-acting pneumatic cylinder 510 to over-center mechanism 179 in one direction ensures that plunger 175 and a portion of end-cap 171 is inserted into cartridge tube 302 as shown, for example, in FIG. 4C. The force applied by first double-acting pneumatic cylinder 510 to over-center mechanism 179 in the opposite direction ensures that plunger 175 is extracted from interior 303 of cartridge tube 302. The travel length of first double-acting pneumatic cylinder 510 is such that end-cap 171 is positioned away from cartridge housing 173 as shown, for example, in FIG. 5B. In this position, end-cap 171 and plunger 175 do not interfere with access to first end 176 of cartridge housing 173, which allows removing, replacing, and/or installing cartridge tube 302.

Referring generally to FIGS. 1A and 1B, and particularly to, e.g., FIG. 4E, flowable-material dispenser 160 further comprises second end-cap 172, located opposite end-cap 171 at second end 177 of cartridge housing 173 of flowable-material dispenser 160 and configured to seal against cartridge tube 302 when cartridge tube 302 is within cartridge housing 173 and end-cap 171 is retained relative to cartridge housing 173 such that end-cap 171 sealingly engages interior 303 of cartridge tube 302. The preceding subject matter of this paragraph characterizes example 11 of the present disclosure, wherein example 11 also includes the subject matter according to any one of examples 4 to 10, above.

The seal between second end-cap 172 and cartridge tube 302 ensures that flowable material 308 is directed from cartridge tube 302 through second end-cap 172 and toward the dispensing tip of flowable-material dispenser 160. Furthermore, this seal ensures that flowable material 308 does not flow into the space between cartridge tube 302 and cartridge housing 173, thereby preventing contamination of cartridge housing 173. The seal is established when cartridge tube 302 is inserted into cartridge housing 173 and maintained until cartridge tube 302 is removed from cartridge housing 173.

In some examples, as shown in FIG. 4E, second end-cap 172 comprises gasket 163 for sealing against cartridge tube 302. When cartridge tube 302 is inserted into cartridge housing 173, the leading end of cartridge tube 302 is pressed against gasket 163, establishing the seal. Gasket 163 is formed from an elastomeric material (e.g., rubber). As shown in FIG. 4E, a sealing portion of second end-cap 172 overlaps with cartridge tube 302 or, more specifically, with the leading end of cartridge tube 302, for additional sealing and/or maintaining orientation of cartridge tube 302. For example, this sealing portion of second end-cap 172 protrudes into cartridge tube 302.

Referring generally to FIGS. 1A and 1B, and particularly to, e.g., FIG. 4E, flowable-material dispenser 160 further comprises cartridge-ejection inlet 530, pneumatically coupled with second end-cap 172 to selectively supply compressed fluid inside cartridge housing 173 of flowable-material dispenser 160 for ejecting cartridge tube 302 from cartridge housing 173 when end-cap 171 is removed from cartridge tube 302, received within cartridge housing 173. The preceding subject matter of this paragraph characterizes example 12 of the present disclosure, wherein example 12 also includes the subject matter according to example 11, above.

Cartridge-ejection inlet 530 is used to break the seal between second end-cap 172 and cartridge tube 302 and remove cartridge tube 302 from cartridge housing 173. In one or more examples, access to cartridge tube 302 from first end 176 of cartridge housing 173 is limited. For instance, FIGS. 4C and 4D illustrate only a small portion of cartridge tube 302 protruding from cartridge housing 173 at first end 176 of cartridge housing 173. Specifically, the flow of the compressed fluid (e.g., compressed air) through cartridge-ejection inlet 530 into cartridge housing 173, at a location close to second end-cap 172, increases the pressure inside cartridge housing 173 at second end 177. This pressure forces plunger 175 away from second end-cap 172. The gap between cartridge housing 173 and cartridge tube 302 is minimal (e.g., less than 1 millimeter) to pressurize an area inside cartridge housing 173, at least near second end-cap 172.

In one or more examples, the outer diameter of cartridge tube 302 is substantially the same as the inner diameter of cartridge housing 173 (e.g., within 10% or within 5%). As such, the compressed fluid cannot easily escape between cartridge tube 302 and cartridge housing 173 when compressed gas is supplied into cartridge housing 173 at a location close to second end-cap 172. In one or more examples, cartridge-ejection inlet 530 comprises a valve and a coupling to a source of the compressed fluid, such as compressed air. More specifically, the operation of cartridge-ejection inlet 530 is synchronized with operation of other components of apparatus 100, such as over-center mechanism 179. For example, cartridge-ejection inlet 530 supplies the compressed fluid inside cartridge housing 173 only after over-center mechanism 179 moves end-cap 171 away from second end 177 of cartridge housing 173, thereby allowing cartridge tube 302 to be removed from cartridge housing 173.

Referring generally to FIGS. 1A and 1B, and particularly to, e.g., FIG. 4E, flowable-material dispenser 160 further comprises vent 162, located at second end 177 of cartridge housing 173. Vent 162 is configured to admit atmosphere into cartridge tube 302, received inside cartridge housing 173, as plunger 175 is retracted within cartridge tube 302 from second end 177 of cartridge housing 173 toward first end 176 of cartridge housing 173. The preceding subject matter of this paragraph characterizes example 13 of the present disclosure, wherein example 13 also includes the subject matter according to example 11 or 12, above.

When plunger 175 is moved within cartridge tube 302 from first end 176 to second end 177 of cartridge housing 173, flowable material 308 is dispensed from cartridge tube 302. Vent 162 is closed during this operation to prevent flowable material 308 from escaping through vent 162. On the other hand, when plunger 175 is retracted within cartridge tube 302 from second end 177 to first end 176, the volume inside cartridge tube 302, previously occupied by flowable material 308, needs to be backfilled. If the volume is not backfilled, the excessive negative pressure within cartridge tube 302, between plunger 175 and the dispensing nozzle, will prevent plunger 175 from being moved within cartridge tube 302. Furthermore, this negative pressure can pull a portion of flowable material 308, remaining in apparatus 100 (e.g., in the dispensing nozzle), back into cartridge tube 302. During this plunger extraction operation, vent 162 is open and admits the atmosphere into cartridge tube 302. Cartridge tube 302 is effectively backfilled, which allows effortless movement of plunger 175 within cartridge tube 302 from second end 177 toward first end 176 of cartridge housing 173.

In one or more examples, vent 162 comprises a valve, one end of which is in fluid communication with interior 303 of cartridge tube 302 (when cartridge tube 302 is positioned inside cartridge housing 173). The other end of this valve is open to the atmosphere. In one or more examples, the operation of vent 162 is synchronized with the operation of other components of apparatus 100, such as rotary actuator 120. Specifically, vent 162 allows the atmosphere into cartridge tube 302 when rotary actuator 120 is turning in second rotational direction 122, resulting in hydraulic fluid 155 being transferred from flowable-material dispenser 160 to reservoir 140.

Referring generally to FIGS. 1A and 1B, and particularly to, e.g., FIG. 4E, vent 162 is further configured to admit atmosphere into cartridge tube 302, received inside cartridge housing 173, as plunger 175 is extracted from cartridge tube 302 by end-cap 171. The preceding subject matter of this paragraph characterizes example 14 of the present disclosure, wherein example 14 also includes the subject matter according to example 13, above.

When plunger 175 is retracted within cartridge tube 302 from second end 177 to first end 176 and later extracted from cartridge tube 302, the volume inside cartridge tube 302, previously occupied by flowable material 308, needs to be backfilled to avoid excessive negative pressure within cartridge tube 302. If the volume is not backfilled, the excessive negative pressure will prevent plunger 175 from being extracted from cartridge tube 302.

In one or more examples, the backfill continues as plunger 175 is completely; extracted from cartridge tube 302 by end-cap 171. Overall, the force acting on plunger 175 and created by the negative pressure of hydraulic fluid 155, should be greater than the friction force between plunger 175 and cartridge tube 302 and should also exceed any negative pressure within cartridge tube 302 between plunger 175 and the dispensing nozzle. Backfilling through vent 162 allows reducing this negative pressure within cartridge tube 302 between plunger 175 and the dispensing nozzle.

In one or more examples, the operation of vent 162 is synchronized with operation of other components of apparatus 100, such as over-center mechanism 179 or, more specifically, first double-acting pneumatic cylinder 510, operatively coupled to over-center mechanism 179. Specifically, vent 162 allows the atmosphere into cartridge tube 302 when over-center mechanism 179 moves end-cap 171 away from first end 176 of cartridge housing 173, thereby extracting plunger 175 from cartridge tube 302. It should be noted that plunger 175 is supported on end-cap 171 during this operation by the negative pressure of hydraulic fluid 155.

Referring generally to FIGS. 1A and 1B, and particularly to, e.g., FIGS. 4C and 4D, piston 145 comprises third gasket 423, configured to seal against cartridge tube 302. The preceding subject matter of this paragraph characterizes example 15 of the present disclosure, wherein example 15 also includes the subject matter according to any one of examples 2 to 14, above.

Sealing third gasket 423 of piston 145 against cartridge tube 302 allows pressurizing hydraulic fluid 155, particularly in a volume between piston 145 and end-cap 171, as shown in FIG. 4D. This seal prevents hydraulic fluid 155 from leaking past piston 145 and from contacting flowable material 308 inside cartridge tube 302. At the same time, the pressure is needed to advance piston 145 from first end 176 to second end 177 of cartridge housing 173 and displace flowable material 308 from cartridge tube 302. Furthermore, this seal prevents air being introduced into the pool of hydraulic fluid 155, which is positioned between piston 145 and end-cap 171 when piston 145 is extracted from cartridge tube 302 (e.g., pulled by the negative pressure of hydraulic fluid 155 from second end 177 to first end 176 of cartridge housing 173). Third gasket 423 allows piston 145 to move within cartridge tube 302 while maintaining the seal against cartridge tube 302.

In one or more examples, third gasket 423 is formed from an elastomeric material (e.g., rubber). In the same or other examples, third gasket 423 is positioned in an annular groove of piston 145 and protrudes past the surface of piston 145, adjacent to the annular groove, to form interference fit with interior 303 of cartridge tube 302.

Referring generally to FIGS. 1A and 1B, and particularly to, e.g., FIGS. 4B and 4C, cartridge tube 302 comprises cartridge plunger 304, comprising rear surface 305 and front surface 301, opposite rear surface 305. Plunger 175 comprises thrust surface 178, complementary in shape to rear surface 305 of cartridge plunger 304. The preceding subject matter of this paragraph characterizes example 16 of the present disclosure, wherein example 16 also includes the subject matter according to any one of examples 2 to 15, above.

Cartridge plunger 304 seals flowable material 308 within interior 303 of cartridge tube 302 prior to installation of cartridge tube 302 into cartridge housing 173. Once cartridge tube 302 is installed in cartridge housing 173 and plunger 175 is inserted into cartridge tube 302, cartridge plunger 304 separates plunger 175 from flowable material 308, thereby preventing any direct contact between plunger 175 and flowable material 308 and contamination of plunger 175. Cartridge plunger 304 is advanced by plunger 175 from one end of cartridge tube 302, proximate to first end 176 of cartridge housing 173, to another end of cartridge tube 302, proximate to second end 177 of cartridge housing 173. During this operation, thrust surface 178 of plunger 175 is pressed against rear surface 305 of cartridge plunger 304. The complementary shapes of rear surface 305 of cartridge plunger 304 and thrust surface 178 of plunger 175 ensure that the original or working shape of cartridge plunger 304 is preserved and that cartridge plunger 304 continues to separate plunger 175 from flowable material 308.

In one or more examples, cartridge plunger 304 is flexible or, more specifically, deformable. In these examples, rear surface 305 of cartridge plunger 304 becomes complementary in shape to thrust surface 178 of plunger 175 when rear surface 305 of cartridge plunger 304 is contacted by thrust surface 178 of plunger 175 and while plunger 175 advances cartridge plunger 304 within cartridge tube 302. In one or more examples, both rear surface 305 of cartridge plunger 304 and thrust surface 178 of plunger 175 have a dome shape.

Referring generally to FIGS. 1A and 1B, and particularly to, e.g., FIGS. 6A and 6B, flowable-material dispenser 160 further comprises dispenser valve 600, located at second end 177 of cartridge housing 173, and second double-acting pneumatic cylinder 520, configured to selectively open or close dispenser valve 600. The preceding subject matter of this paragraph characterizes example 17 of the present disclosure, wherein example 17 also includes the subject matter according to any one of examples 2 to 16, above.

Dispenser valve 600 controls the flow of flowable material 308 from apparatus 100. This control is used in addition to control provided by rotary actuator 120. Furthermore, when dispenser valve 600 is closed, flowable material 308, which remains in flowable-material dispenser 160, is isolated from the environment (e.g., to prevent curing of the remaining portion of flowable material 308 that is still inside flowable-material dispenser 160). When dispenser valve 600 is open, flowable material 308 passes through dispenser valve 600 and is dispensed from apparatus 100. In one or more examples, a combination of dispenser valve 600 and rotary actuator 120 is used to control the pressure of hydraulic fluid 155, which in turn controls the flow rate of flowable material 308.

In one or more examples, dispenser valve 600 comprises stem 612, protruding through pass-through 614 and supporting plug 610, as shown, for instance, in FIGS. 6A and 6B. When plug 610 is pressed against pass-through 614 as shown, for example, in FIG. 6A, dispenser valve 600 is closed and flowable material 308 cannot pass through dispenser valve 600. On the other hand, when plug 610 is positioned away from pass-through 614 as shown, for example, in FIG. 6B, dispenser valve 600 is open and flowable material 308 is able to pass through dispenser valve 600. In one or more examples, dispenser valve 600 has one or more partially open positions.

Referring generally to FIGS. 1A and 1B, and particularly to, e.g., FIGS. 3A and 3B, linear actuator 130 comprises screw 135, ball nut 134, and plurality of balls 133, threadably coupling screw 135 and ball nut 134. Screw 135 has central axis 131 and is coupled to piston 145. Ball nut 134 is coupled to one of gears in gear train 125. The preceding subject matter of this paragraph characterizes example 18 of the present disclosure, wherein example 18 also includes the subject matter according to any one of examples 1 to 17, above.

A combination of screw 135, ball nut 134, and plurality of balls 133 in linear actuator 130 translates the rotation of ball nut 134, which is driven by gear train 125, into the linear motion of screw 135, which is coupled to piston 145. As such, the precise rotation of rotary actuator 120, through gear train 125 to ball nut 134, is translated in the precise linear motion of screw 135 and, more specifically, of piston 145. The linear motion of piston 145 within reservoir 140 results in the precise transfer of hydraulic fluid 155 between reservoir 140 and flowable-material dispenser 160, which in turn results in the precise dispensing of flowable material 308.

In one or more examples, screw 135 is a threaded shaft, which provides a helical raceway for a plurality of balls 133. Linear actuator 130 is able to apply or withstand high thrust loads (e.g., for dispensing flowable materials 308 that have high viscosities) with minimum internal friction. Close tolerances screw 135, ball nut 134, and plurality of balls 133 provide high precision with minimal friction.

Referring generally to FIGS. 1A and 1B, and particularly to, e.g., FIGS. 3B-3D, linear actuator 130 comprises housing 138 and anti-rotation mechanism 139, coupled to housing 138 and slidably coupled to screw 135. Anti-rotation mechanism prevents screw 135 from rotating around central axis 131 of screw 135 relative to housing 138. Housing is stationary relative to rotary actuator 120. The preceding subject matter of this paragraph characterizes example 19 of the present disclosure, wherein example 19 also includes the subject matter according to example 18, above.

Anti-rotation mechanism 139 ensures that screw 135 does not rotate relative to housing 138 around central axis 131 of screw 135. As such, anti-rotation mechanism 139 ensures the exact relationship between the rotation of ball nut 134 and the linear motion of screw 135. This relationship is provided by the thread pitch of ball nut 134 and screw 135, which is fixed, and the rotation of ball nut 134 relative to screw 135 around central axis 131 of screw 135. Thus, by preventing screw 135 from rotating, the rotation of ball nut 134 provides the exclusive control of this linear motion, thereby ensuring the precise dispensing of flowable material 308.

The thread pitch of ball nut 134 and screw 135 is, for example, between 0.1 millimeters and 10 millimeters or, more specifically, between 0.5 millimeters and 3 millimeters. For example, a thread pitch of 1 millimeter results in a 1 millimeter linear motion of screw 135 for each rotation of ball nut 134 relative to screw 135. Since ball nut 134 does not rotate around central axis 131, the rotation of ball nut 134 controls this linear motion.

Referring generally to FIGS. 1A and 1B, and particularly to, e.g., FIGS. 3B and 3C, screw 135 comprises slot 192. Anti-rotation mechanism 139 comprises protrusion 191, extending into slot 192 of screw 135. Slot 192 extends along central axis 131 of screw 135. The preceding subject matter of this paragraph characterizes example 20 of the present disclosure, wherein example 20 also includes the subject matter according to example 19, above.

Protrusion 191 is coupled to housing 138 and extends into slot 192 of screw 135. As such, screw 135 is not able to rotate around central axis 131 relative to housing 138. Preventing the rotation of screw 135, provided by protrusion 191 and slot 192, ensures the exclusive control of the linear translation of screw 135 by the rotation of ball nut 134. Slot 192, extending along central axis 131 of screw 135, enables screw 135 to linearly move relative to protrusion 191 and relative to housing 138, so that piston 145 is linearly advanced inside reservoir 140.

In some examples, protrusion 191 is a set screw, threaded into housing 138. In these examples, protrusion 191 is adjustable relative to screw 135 (e.g., to extend into slot 192 during operation of apparatus 100 or to retract from slot 192 during disassembly of apparatus 100). In one or more examples, slot 192 has two parallel walls, extending along central axis 131, as shown, for example, in FIG. 3C.

Referring generally to FIGS. 1A and 1B, and particularly to, e.g., FIGS. 3B and 3D, screw 135 comprises first surface 193. Anti-rotation mechanism 139 comprises second surface 194, slidably contacting first surface 193 of screw 135 at at least two points of first surface 193 that lie on opposite sides of orthogonal projection 132 of central axis 131 onto first surface 193. The preceding subject matter of this paragraph characterizes example 21 of the present disclosure, wherein example 21 also includes the subject matter according to example 19, above.

The slidable contact between second surface 194 and first surface 193 enable screw 135 to linearly translate relative to housing 138 along central axis 131. At the same time, since contact exists between second surface 194 and first surface 193 at at least two points that lie on opposite sides of orthogonal projection 132 of central axis 131 onto first surface 193, rotation of screw 135 relative to second surface 194 and relative to housing 138 is prevented, ensuring exclusive control of the linear translation of screw 135 by the rotation of ball nut 134.

In one or more examples, first surface 193 and second surface 194 are conformal surfaces or, more specifically, planar surfaces as shown, for example, in FIG. 3D. However, other types of surfaces that contact each other at at least two points that lie on opposite sides of orthogonal projection 132 of central axis 131 are also within the scope of the present disclosure.

Referring generally to FIGS. 1A and 1B, and particularly to, e.g., FIGS. 3E and 3F piston 145 and reservoir 140 have complementary, non-circular cross-sections. The preceding subject matter of this paragraph characterizes example 22 of the present disclosure, wherein example 22 also includes the subject matter according to any one of examples 1 to 18, above.

The non-circular aspect of the complementary non-circular cross-sections of piston 145 and reservoir 140 prevents rotation of piston 145 around central axis 131 relative to reservoir 140. Piston 145 is also coupled to screw 135, which, as a result of this coupling, also does not rotate around central axis 131 relative to reservoir 140 or, more specifically, relative to housing 138. Preventing the rotation of screw 135 ensures the exclusive control of the linear translation of screw 135 by the rotation of ball nut 134. However, piston 145 is allowed to linearly translate relative to reservoir 140 along central axis 131. Furthermore, the complementary aspect of the non-circular cross-sections establishes a seal between piston 145 and reservoir 140 such that hydraulic fluid 155 does not leak past piston 145 during operation of apparatus 100.

The complementary non-circular cross-sections of piston 145 and reservoir 140 have any shape that is different from that of a circle. Any such shape will prevent rotation of piston 145 relative to reservoir 140. FIG. 3E illustrates an example of an oval shape, while FIG. 3F illustrates an example of a rectangular shape. In one or more examples, at least one gasket is positioned at the interface of piston 145 and reservoir 140.

Referring generally to FIGS. 1A and 1B, and particularly to, e.g., FIG. 3E, the complementary non-circular cross-sections are oval. The preceding subject matter of this paragraph characterizes example 23 of the present disclosure, wherein example 23 also includes the subject matter according to example 22, above.

The oval shapes of the complementary non-circular cross-sections of piston 145 and reservoir 140 prevent rotation of piston 145 around central axis 131 relative to reservoir 140. Piston 145 is also coupled to screw 135, which, as a result of this coupling, also does not rotate around central axis 131 relative to reservoir 140 or, more specifically, relative to housing 138. Preventing the rotation of screw 135 ensures the exclusive control of the linear translation of screw 135 by the rotation of ball nut 134. However, piston 145 is allowed to linearly translate relative to reservoir 140 along central axis 131. Furthermore, the complementary aspect of the oval cross-sections establishes a seal between piston 145 and reservoir 140 such that hydraulic fluid 155 does not leak past piston 145 during operation of apparatus 100.

The oval shape, or any other shape without sharp corners, allows using a continuous seal, thereby sealing the interface between piston 145 and reservoir 140. Furthermore, fabrication of pistons and reservoirs having oval shapes is generally simpler than that of parts having shapes with sharp corners.

Referring generally to FIGS. 1A and 1B and particularly to, e.g., FIG. 3F, the complementary non-circular cross-sections are rectangular. The preceding subject matter of this paragraph characterizes example 24 of the present disclosure, wherein example 24 also includes the subject matter according to example 22, above.

The rectangular shape of complementary non-circular cross-sections of piston 145 and reservoir 140 prevents rotation of piston 145 around central axis 131 relative to reservoir 140. Piston 145 is also coupled to screw 135, which, as a result of this coupling, also does not rotate around central axis 131 relative to reservoir 140 or, more specifically, relative to housing 138. Preventing the rotation of screw 135 ensures the exclusive control of the linear translation of screw 135 by the rotation of ball nut 134. However, piston 145 is allowed to linearly translate relative to reservoir 140 along central axis 131. Furthermore, the complementary aspect of the rectangular cross-sections establishes a seal between piston 145 and reservoir 140 such that hydraulic fluid 155 does not leak past piston 145 during operation of apparatus 100.

The rectangular shape, or any other shape with sharp corners, is able to withstand large torques applied to piston 145, e.g., when linear actuator 130 experiences friction or when piston 145 reaches an end point and further motion is not possible. For example, rotary actuator 120 is automatically shut down when experiencing a torque spike (e.g., when piston 145 reaches the end of its travel). However, other components of apparatus 100 should be able to withstand this torque as well.

Referring generally to FIGS. 1A and 1B, and particularly to, e.g., FIG. 2, apparatus 100 further comprises conduit 150, hydraulically coupling flowable-material dispenser 160 with reservoir 140. The preceding subject matter of this paragraph characterizes example 25 of the present disclosure, wherein example 25 also includes the subject matter according to any one of examples 1 to 24, above.

Conduit 150 allows separation and different orientations of flowable-material dispenser 160 and reservoir 140 relative to each other. As a result, apparatus 100 is more compact than it would have been if, for instance, flowable-material dispenser 160 were directly coupled to reservoir 140. For example, FIG. 2 illustrates flowable-material dispenser 160 and reservoir 140 positioned along different axes.

In one or more examples, conduit 150 is flexible, which allows movement of flowable-material dispenser 160 relative to reservoir 140. For example, reservoir 140 is a part of stationary components of apparatus 100, while flowable-material dispenser 160 is a movable component.

Referring generally to FIGS. 7A and 7B and particularly to, e.g., FIGS. 3A-3B, 4A-4D, 5A, 5B, method 700 for dispensing flowable material 308 using apparatus 100 is disclosed. Apparatus 100 comprises rotary actuator 120, reservoir 140, containing hydraulic fluid 155, and piston 145, movable inside reservoir 140. Apparatus 100 also comprises linear actuator 130, coupled to piston 145, and gear train 125, coupling rotary actuator 120 with linear actuator 130. Apparatus 100 additionally comprises flowable-material dispenser 160, comprising cartridge housing 173 and plunger 175 and hydraulically coupled with reservoir 140. Apparatus 100 further comprises end-cap 171, movably coupled with flow/able-material dispenser 160, and over-center mechanism 179, movably coupling end-cap 171 with cartridge housing 173 of flowable-material dispenser 160. Method 700 comprises (block 710) holding hydraulic fluid 155 in reservoir 140 at a negative pressure, sufficient to generate a vacuum between end-cap 171 and plunger 175, (block 720) inserting cartridge tube 302, having interior 303, into cartridge housing 173, wherein flowable material 308 is inside cartridge tube 302, (block 730) locking over-center mechanism 179 relative to cartridge housing 173 so that a hermetic seal is created between plunger 175 and interior 303 of cartridge tube 302 and between end-cap 171 and interior 303 of cartridge tube 302, and (block 740) turning rotary actuator 120 in rotational direction 121 so that linear actuator 130 advances piston 145 within reservoir 140 to transfer at least a portion of hydraulic fluid 155 from reservoir 140 to flowable-material dispenser 160 through end-cap 171 and into interior 303 of cartridge tube 302, causing plunger 175 to advance within cartridge tube 302 in forward plunger direction 181, away from end-cap 171. The preceding subject matter of this paragraph characterizes example 26 of the present disclosure.

When hydraulic fluid 155 is held at a negative pressure in reservoir 140, this negative pressure is also present in all other areas of apparatus 100 occupied by hydraulic fluid 155. As a result, plunger 175, which contacts hydraulic fluid 155, is forced by hydraulic fluid 155 toward and against end-cap 171. This force supports plunger 175 on end-cap 171 and allows positioning plunger 175 away front cartridge housing 173 when end-cap 171 is moved away from cartridge housing 173. This position of plunger 175 and end-cap 171, away from cartridge housing 173, provides access to cartridge housing 173 allowing to insert cartridge tube 302 into cartridge housing 173 (block 720).

Referring to FIGS. 5A and 5B, one end of over-center mechanism 179 is attached to end-cap 171. When over-center mechanism 179 is locked relative to cartridge housing 173 as shown in FIG. 5B, plunger 175 is pressed by end-cap 171 into interior 303 and is hermetically sealed against interior 303 as shown in FIG. 4C. The hermetic seal prevents flowable material 308 from flowing past plunger 175. Furthermore, the hermetic seal prevents hydraulic fluid 155 from flowing past plunger 175 and reaching flowable material 308. However, the seal allows plunger 175 to advance within cartridge tube 302.

The other hermetic seal is formed between end-cap 171 and interior 303 of cartridge tube 302. This other seal keeps hydraulic fluid 155 within interior 303 when hydraulic fluid 155 is transferred into interior 303 and maintained at a positive pressure or at a negative pressure (e.g., to advance plunger 175 within cartridge tube 302). This seal is maintained while end-cap 171 is positioned at first end 176 of cartridge housing 173.

When rotary actuator 120 is turned in rotational direction 121, linear actuator 130 advances piston 145 within reservoir 140, as schematically shown in FIG. 3B. The rotational speed and the degree of rotation of rotary actuator 120 are precisely controlled. This control translates into the precise linear motion of piston 145. As piston 145 moves within reservoir 140, at least a portion of hydraulic fluid 155 is transferred from reservoir 140 to flowable-material dispenser 160. Specifically, hydraulic fluid 155 flows through end-cap 171 into interior 303 of cartridge tube 302. This addition of hydraulic fluid 155 causes plunger 175 to advance within cartridge tube 302 in forward plunger direction 181 and away from end-cap 171. As a result, flowable material 308 is displaced by plunger 175 out of cartridge tube 302. The precision of rotary actuator 120 results in flowable material 308 being dispensed in a precisely controlled manner.

Some examples of hydraulic fluid 155 include mineral oils, glycols (e.g., propylene glycol), esters, organophosphate esters, polyalphaolefins, and silicone oils. Hydraulic fluid 155 is non-compressible. As a result, the volume of hydraulic fluid 155 displaced from reservoir 140 is the same as the volume of hydraulic fluid 155 received in flowable-material dispenser 160.

The negative pressure of hydraulic fluid 155 is generated in reservoir 140 by advancing piston 145 inside reservoir 140 away from the hydraulic fluid outlet (e.g., a coupling to conduit 150). The negative pressure of hydraulic fluid 155 is determined by the contact area between piston 145 and hydraulic fluid 155 and by the sealing and supporting force needed between piston 145 and end-cap 171.

Over-center mechanism 179 is attached to end-cap 171 and configured to move end-cap 171 with piston 145, supported on end-cap 171, between two positions. In one position, end-cap 171 and piston 145 are spaced away from cartridge housing 173 or, more specifically, from first end 176 of cartridge housing 173. This position allows inserting cartridge tube 302 into cartridge housing 173. In another position, plunger 175 is inserted into interior 303 and hermetically sealed against interior 303. In this portion, end-cap 171 is also sealed against interior 303. Furthermore, plunger 175 is now movable within interior 303.

Rotary actuator 120 is turned in one of rotational direction 121 and second rotational direction 122, which causes the transfer of hydraulic fluid 155 between reservoir 140 and flowable-material dispenser 160. Some examples of rotary actuator 120 include, but are not limited to, stepper motors, servo motors, and the like. These examples provide very precise control of the rotation speed and the degree of rotation, which in turn enables flowable material 308 to be dispensed in precise quantities.

Referring generally to FIGS. 7A-7B and particularly to, e.g., FIG. 4E, according to method 700, (block 722) inserting cartridge tube 302 into cartridge housing 173 comprises hermetically sealing cartridge tube 302 against second end-cap 172 of flowable-material dispenser 160, attached to cartridge housing 173 opposite of end-cap 171. The preceding subject matter of this paragraph characterizes example 27 of the present disclosure, wherein example 27 also includes the subject matter according to example 26, above.

When second end-cap 172 is sealed against cartridge tube 302, flowable material 308 is directed from cartridge tube 302 through second end-cap 172 and toward the dispensing tip of flowable-material dispenser 160. This seal ensures that flowable material 308 does not flow into space between cartridge tube 302 and cartridge housing 173, thereby preventing contamination of cartridge housing 173. The seal is established when cartridge tube 302 is inserted into cartridge housing 173 and is maintained until cartridge tube 302 is removed from cartridge housing 173.

In some examples, as shown in FIG. 4E, second end-cap 172 comprises gasket 163 for sealing against cartridge tube 302. Gasket 163 is formed of an elastomeric material (e.g., rubber). As shown in FIG. 4E, a portion of second end-cap 172 overlaps with cartridge tube 302 for additional sealing and/or maintaining orientation of cartridge tube 302. For example, this portion of second end-cap 172 protrudes into cartridge tube 302.

Referring generally to FIGS. 7A and 7B, and particularly to, e.g., FIGS. 4A, 4B, 4C, 5A, 5B, according to method 700, (block 730) locking over-center mechanism 179 relative to cartridge housing 173 is performed while plunger 175 is coupled to end-cap 171 and comprises inserting plunger 175 into interior 303 of cartridge tube 302. The preceding subject matter of this paragraph characterizes example 28 of the present disclosure, wherein example 28 also includes the subject matter according to example 26 or 27, above.

Over-center mechanism 179 is used to move end-cap 171 and plunger 175 relative to cartridge housing 173. In one position, plunger 175 and end-cap 171 are positioned away from cartridge housing 173 or, more specifically, away from first end 176 of cartridge housing 173. In another position, end-cap 171 is positioned at first end 176 of cartridge housing 173 and plunger 175 is inserted into cartridge tube 302. At this position, over-center mechanism 179 is locked.

End-cap 171 is pivotable by over-center mechanism 179 relative to cartridge housing 173 as shown, for example, in FIGS. 5A and 5B. In some examples, over-center mechanism 179 comprises multiple arms pivotably coupled to each other. The number and the length of these arms establish the trajectory of end-cap 171 when end-cap 171 is moved by over-center mechanism 179. In one or more examples, the movement of end-cap 171 relative to cartridge housing 173 is substantially along the center axis of cartridge housing 173 when end-cap 171 approaches first end 176 of cartridge housing 173. As described above, end-cap 171 supports plunger 175, and plunger 175 is inserted into cartridge tube 302, when end-cap 171 approaches first end 176 of cartridge housing 173.

Referring. e.g., to FIGS. 7A and 7B, method 700 further comprises (block 750) monitoring pressure inside reservoir 140. The preceding subject matter of this paragraph characterizes example 29 of the present disclosure, wherein example 29 also includes the subject matter according to any one of examples 26 to 28, above.

The pressure inside reservoir 140 is monitored to control the dispensing rate of flowable material 308. Furthermore, the pressure inside reservoir 140 is monitored to ensure support to plunger 175 by end-cap 171, e.g., when plunger 175 is extracted from cartridge tube 302 and moved away from of cartridge housing 173. When this pressure, inside reservoir 140, exceeds atmospheric pressure, which is referred to as a positive pressure, plunger 175 is forced from first end 176 to second end 177 of cartridge housing 173. At some point, the positive pressure overcomes the frictional resistance of plunger 175, relative to cartridge tube 302, and also the flow resistance of flowable material 308, and plunger 175 starts moving from first end 176 to second end 177. The speed of this movement depends on the level of this positive pressure (relative to the frictional forces and flow resistance). As plunger 175 moves from first end 176 to second end 177, plunger 175 displaces flowable material 308 from cartridge tube 302. As such, the positive pressure controls the plunger speed, which, in turn, determines the dispensing rate of flowable material 308.

When this pressure is a negative pressure (i.e., is below atmospheric pressure), plunger 175 is forced from second end 177 to first end 176 of cartridge housing 173 and against end-cap 171. When end-cap 171 is moved away from cartridge housing 173, end-cap 171 pulls plunger 175 out of cartridge tube 302 and supports plunger 175 until plunger 175 is reinserted into a new cartridge tube.

In one or more examples, the pressure inside reservoir 140 is monitored using a gauge attached to reservoir 140 or to conduit 150. It should be noted that the pressure inside reservoir 140 is the same as in any other volume of apparatus 100 containing hydraulic fluid 155.

Referring generally to FIGS. 7A and 7B, and particularly to, e.g., FIGS. 3A and 3B, according to method 700, (block 740) turning rotary actuator 120 in rotational direction 121 is terminated once the pressure inside reservoir 140 reaches a predetermined level. The preceding subject matter of this paragraph characterizes example 30 of the present disclosure, wherein example 30 also includes the subject matter according to example 29, above.

The pressure inside reservoir 140 is monitored to control the dispensing rate of flowable material 308. Specifically, the positive pressure of hydraulic fluid 155 applies a force to plunger 175 from first end 176 to second end 177 of cartridge housing 173, thereby displacing flowable material 308 from cartridge housing 173. The plunger 175 stops once plunger 175 reaches second end 177. At this point, supplying an additional portion of hydraulic fluid 155 from reservoir 140 to cartridge housing 173 will increase the pressure of hydraulic fluid 155. To ensure safety and to prevent damage of various components of apparatus 100 from excessive pressure of hydraulic fluid 155, turning rotary actuator 120 in rotational direction 121 is terminated once the pressure inside reservoir 140 reaches the predetermined level. In one or more examples, even before plunger 175 reaches second end 177, the pressure inside reservoir 140 is controlled for the same reasons and also to prevent excessive dispensing rates of flowable material 308.

In one or more examples, the pressure inside reservoir 140 is monitored using a gauge, attached to reservoir 140 or conduit 150. In these examples, the gauge is coupled to the switch, which controls rotary actuator 120, e.g., either directly or through a central controller.

Referring generally to FIGS. 7A and 7B, and particularly to, e.g., FIGS. 3A and 3B, method 700 further comprises (block 760) turning rotary actuator 120 in second rotational direction 122, opposite of rotational direction 121, so that linear actuator 130 retracts piston 145 within reservoir 140 and at least a portion of hydraulic fluid 155 is transferred from flowable-material dispenser 160 to reservoir 140, causing plunger 175 to retract within cartridge tube 302 in reverse plunger direction 182, opposite of forward plunger direction 181. The preceding subject matter of this paragraph characterizes example 31 of the present disclosure, wherein example 31 also includes the subject matter according to any one of examples 26 to 30, above.

Turning rotary actuator 120 in second rotational direction 122 results in piston 145 moving away from the hydraulic fluid exit in reservoir 140. As a result, hydraulic fluid 155 is being transferred from flowable-material dispenser 160 to reservoir 140 during this operation. This transfer of hydraulic fluid 155 creates a negative pressure in hydraulic fluid 155. This negative pressure causes plunger 175 to retract within cartridge tube 302 in reverse plunger direction 182, opposite of forward plunger direction 181. Specifically, plunger 175 moves from second end 177 to first end 176 of cartridge housing 173.

In general, rotary actuator 120 is configured to turn in rotational direction 121 or second rotational direction 122 at different times. Some examples of rotary actuator 120 having this functionality, include, but are not limited to, stepper motors, servo motors, and the like. Furthermore, these examples ensure precise control of the rotation speed and the degree of rotation, which in turn translates into precise dispensing of flowable material 308.

Referring generally to FIGS. 7A and 7B, and particularly to, e.g., FIGS. 3A and 3B, according to method 700, (block 760) turning rotary actuator 120 in second rotational direction 122 comprises (block 762) monitoring pressure inside reservoir 140. The preceding subject matter of this paragraph characterizes example 32 of the present disclosure, wherein example 32 also includes the subject matter according to example 31, above.

The pressure inside reservoir 140 is monitored to determine when plunger 175 reaches end-cap 171. Specifically, as rotary actuator 120 is turned in second rotational direction 122 and hydraulic fluid 155 is transferred from interior 303 of cartridge tube 302 to reservoir 140, plunger 175 moves toward end-cap 171. Once plunger 175 reaches end-cap 171, plunger 175 stops. At this point, transferring an additional portion of hydraulic fluid 155 from interior 303 of cartridge tube 302 to reservoir 140 simply decreases the pressure of hydraulic fluid 155. To ensure safety and to prevent damage of various components of apparatus 100 from excessive negative pressure of hydraulic fluid 155, the pressure of hydraulic fluid 155 inside reservoir 140 is monitored.

In one or more examples, the pressure inside reservoir 140 is monitored using a gauge attached to reservoir 140 or to conduit 150.

Referring generally to FIGS. 7A and 7B, and particularly to, e.g., FIGS. 3A and 3B, according to method 700, (block 760) turning rotary actuator 120 in second rotational direction 122 is terminated once pressure inside reservoir 140 reaches a predetermined level. The preceding subject matter of this paragraph characterizes example 33 of the present disclosure, wherein example 33 also includes the subject matter according to example 32, above.

The pressure inside reservoir 140 is monitored to determine when plunger 175 reaches end-cap 171. Specifically, as rotary actuator 120 is turned in second rotational direction 122 and hydraulic fluid 155 is transferred from interior 303 of cartridge tube 302 to reservoir 140, plunger 175 moves toward end-cap 171. Once plunger 175 reaches end-cap 171, plunger 175 stops. At this point, transferring an additional portion of hydraulic fluid 155 from interior 303 of cartridge tube 302 to reservoir 140 simply decreases the pressure of hydraulic fluid 155. To ensure safety and to prevent damage of various components of apparatus 100 from excessive negative pressure of hydraulic fluid 155, the pressure of hydraulic fluid 155 inside reservoir 140 is monitored. Once the pressure reaches the predetermined level, turning rotary actuator 120 in second rotational direction 122 is terminated.

In one or more examples, the pressure inside reservoir 140 is monitored using a gauge attached to reservoir 140 or to conduit 150. In these examples, the gauge is coupled to the switch, which controls rotary actuator 120, e.g., either directly or through a central controller. In one or more examples, the predetermined level of the pressure is determined to ensure support of plunger 175 on end-cap 171.

Referring generally to FIGS. 7A and 7B, and particularly to, e.g., FIG. 3A, 3B, 4C, according to method 700, (block 760) turning rotary actuator 120 in second rotational direction 122 comprises (block 764) hermetically sealing plunger 175 against end-cap 171. The preceding subject matter of this paragraph characterizes example 34 of the present disclosure, wherein example 34 also includes the subject matter according to any one of examples 31 to 33, above.

Plunger 175 stops once plunger 175 reaches end-cap 171. At this point, transferring an additional amount of hydraulic fluid 155 from interior 303 of cartridge tube 302 to reservoir 140 decreases the pressure of hydraulic fluid 155, thereby creating negative pressure. This negative pressure forces plunger 175 against end-cap 171 and forms a hermetic seal between plunger 175 and end-cap 171. As such, this hermetic seal ensures support of plunger 175 in end-cap 171. Furthermore, the hermetic seal ensures that the negative pressure is maintained and that air is not introduced into hydraulic fluid 155.

Referring to FIG. 4C, plunger 175 is shown directly contacting end-cap 171. The hermetic seal is provided by direct contact between plunger 175 and end-cap 171. Furthermore, in one or more examples, second gasket 422, disposed between plunger 175 and end-cap 171, is used to form the hermetic seal.

Referring generally to FIGS. 7A and 7B, and particularly to, e.g., FIG. 4E, according to method 700, (block 760) turning rotary actuator 120 in second rotational direction 122 comprises (block 766) admitting atmosphere into cartridge tube 302 through vent 162, located in cartridge housing 173. The preceding subject matter of this paragraph characterizes example 35 of the present disclosure, wherein example 35 also includes the subject matter according to any one of examples 31 to 34, above.

As described above, turning rotary actuator 120 in a second rotational direction 122 causes movement of plunger 175 away from second end 177 of cartridge housing 173. Vent 162 admits the atmosphere into cartridge tube 302 during this operation, effectively backfilling cartridge tube 302, e.g., with atmosphere. This backfill prevents flow/able material 308 from being pulled back into cartridge tube 302. Furthermore, the backfill prevents the negative pressure from building up inside cartridge tube 302 (e.g., between plunger 175 away from second end 177 of cartridge housing 173).

In one or more examples, vent 162 comprises a valve, one end of which is in fluid communication with interior 303 of cartridge tube 302 (when cartridge tube 302 is positioned inside cartridge housing 173). The other end of this valve is open to the atmosphere. In one or more examples, the operation of vent 162 is synchronized with operation of other components of apparatus 100, such as rotary actuator 120. Specifically, vent 162 allows the atmosphere to enter cartridge tube 302 when rotary actuator 120 is turning in second rotational direction 122, resulting in the transfer of hydraulic fluid 155 from flowable-material dispenser 160 to reservoir 140.

Referring generally to FIGS. 7A and 7B, and particularly to, e.g., FIG. 4C, according to method 700, plunger 175 is retracted within cartridge tube 302 until annular boss 427 of end-cap 171 protrudes into annular recess 429 of plunger 175. The preceding subject matter of this paragraph characterizes example 36 of the present disclosure, wherein example 36 also includes the subject matter according to any one of examples 31 to 35, above.

When annular boss 427 of end-cap 171 protrudes into annular recess 429 of plunger 175, a geometric coupling is formed between end-cap 171 and plunger 175. This geometric coupling is used in addition to or instead of the vacuum coupling between end-cap 171 and plunger 175 caused by the negative pressure of hydraulic fluid 155.

In one or more examples, annular boss 427 of end-cap 171 and annular recess 429 of plunger 175 have interference fit. In these examples, plunger 175 is formed from a flexible material (e.g., elastomer).

Referring generally to FIGS. 7A and 7B, and particularly to, e.g., FIG. 5A, method 700 further comprises (block 770)

unlocking over-center mechanism 179 relative to cartridge housing 173 to move plunger 175 and end-cap 171 away from cartridge tube 302 and cartridge housing 173. The preceding subject matter of this paragraph characterizes example 37 of the present disclosure, wherein example 37 also includes the subject matter according to any one of examples 26 to 36, above.

Plunger 175 and end-cap 171 are moved away from cartridge tube 302 and cartridge housing 173 to provide access to cartridge tube 302. This position of plunger 175 and end-cap 171 allows removal of cartridge tube 302 from cartridge housing 173 (e.g., to replace cartridge tube 302 with new cartridge tube when flowable material 308 is dispensed from cartridge tube 302).

End-cap 171 is pivotable by over-center mechanism 179 relative to cartridge housing 173 as shown, for example, in FIGS. 5A and 5B. In some examples, over-center mechanism 179 comprises multiple arms pivotably coupled to each other. The number and the length of these arms establish the trajectory of end-cap 171 when end-cap 171 is moved by over-center mechanism 179.

Referring generally to FIGS. 7A and 7B, and particularly to, e.g., FIG. 5A, according to method 700, (block 770) unlocking over-center mechanism 179 relative to cartridge housing 173 comprises (block 772) coupling plunger 175 to end-cap 171. The preceding subject matter of this paragraph characterizes example 38 of the present disclosure, wherein example 38 also includes the subject matter according to example 37, above.

This coupling supports plunger 175 relative to end-cap 171 when plunger 175 is extracted from cartridge tube 302. Furthermore, this coupling supports plunger 175 relative to end-cap 171 when plunger 175 and end-cap 171 are moved away from cartridge tube 302.

Plunger 175 is coupled to end-cap 171, for example, using the negative pressure of hydraulic fluid 155. The negative pressure is created when plunger 175 is positioned against end-cap 171 and rotary actuator 120 continues to turn in second rotational direction 122.

Referring generally to FIGS. 7A and 7B, and particularly to, e.g., FIG. 5A, according to method 700, (block 772) coupling plunger 175 to end-cap 171 comprises (block 774) maintaining negative pressure of hydraulic fluid 155 at least in reservoir 140. The preceding subject matter of this paragraph characterizes example 39 of the present disclosure, wherein example 39 also includes the subject matter according to example 38, above.

Maintaining the negative pressure of hydraulic fluid 155 at least in reservoir 140 also maintains the negative pressure of hydraulic fluid 155 in other portions of apparatus 100 due to hydraulic coupling and flow of hydraulic fluid 155 between reservoir 140 and other portions. Specifically, the negative pressure of hydraulic fluid 155 forces plunger 175 against end-cap 171.

Referring generally to, e.g., FIG. 7B, method 700 further comprises (block 780) removing cartridge tube 302 from cartridge housing 173. The preceding subject matter of this paragraph characterizes example 40 of the present disclosure, wherein example 40 also includes the subject matter according to any one of examples 26 to 39, above.

Cartridge tube 302 is removed from cartridge housing 173 when flowable material 308 is dispensed from cartridge tube 302. For example, a new cartridge tube is later placed inside cartridge housing 173 to replace cartridge tube 302. To remove cartridge tube 302, end-cap 171 is positioned away from cartridge housing 173 providing access to cartridge housing 173. In one or more examples, end-cap 171 supports plunger 175.

Referring generally to FIGS. 7A and 7B, and particularly to, e.g., FIGS. 6A and 6B, method 700 further comprises (block 756) opening dispenser valve 600 of flowable-material dispenser 160, fluidically coupled to interior 303 of cartridge tube 302, to enable flowable material 308 to flow from apparatus 100. The preceding subject matter of this paragraph characterizes example 41 of the present disclosure, wherein example 41 also includes the subject matter according to any one of examples 26 to 40, above.

Dispenser valve 600 controls the flow of flowable material 308 from apparatus 100. In one or more examples, when flowable material 308 is not dispensed, dispenser valve 600 is kept closed. As such, flowable material 308 is isolated from the environment (e.g., to prevent curing of flowable material 308 remaining in apparatus 100).

In one or more examples, dispenser valve 600 is coupled to second double-acting pneumatic cylinder 520, which opens and closes dispenser valve 600, as shown in FIGS. 6A and 6B.

Referring generally to FIGS. 7A and 7B, and particularly to, e.g., FIGS. 6A and 6B, according to method 700, (block 756) opening dispenser valve 600 is synchronized with turning rotary actuator 120 in rotational direction 121. The preceding subject matter of this paragraph characterizes example 42 of the present disclosure, wherein example 42 also includes the subject matter according to example 41, above.

Both dispenser valve 600 and rotary actuator 120 control the flow of flowable material 308 from apparatus 100. Specifically, when rotary actuator 120 turns in rotational direction 121, hydraulic fluid 155 is transferred from reservoir 140 to interior 303 of cartridge tube 302, thereby causing movement of plunger 175 and dispensing of flowable material 308. Dispenser valve 600 controls the flow path of flowable material 308 from cartridge tube 302. Therefore, flowable material 308 is dispensed only when dispenser valve 600 is open and rotary actuator 120 is turning in a rotational direction. Flowable material 308 is not dispensed when either dispenser valve 600 is closed or rotary actuator 120 does not turn in the rotational direction.

In one or more examples, dispenser valve 600 is immediately open when rotary actuator 120 begins turning in the rotational direction. This synchronization prevents building up an excessive hydraulic pressure in apparatus 100, which is otherwise possible when dispenser valve 600 remains closed while rotary actuator 120 continues turning in the rotational direction. In the same or other examples, dispenser valve 600 is closed as soon as rotary actuator 120 stops turning in the rotational direction. This feature prevents exposure of a portion of flowable material 308, remaining in apparatus 100, to the environment. In one or more examples, dispenser valve 600 remains closed even when rotary actuator 120 starts turning in second rotational direction 122, opposite of rotational direction 121.

Referring generally to FIGS. 7A and 7B, and particularly to, e.g., FIGS. 3B and 3C-3F, according to method 700, piston 145 is coupled to rotary actuator 120 by screw 135 and ball nut 134. Piston 145 does not rotate relative to reservoir 140 as piston 145 advances or retracts within reservoir 140. The preceding subject matter of this paragraph characterizes example 43 of the present disclosure, wherein example 43 also includes the subject matter according to any one of examples 26 to 42, above.

Screw 135 is non-rotatably coupled to piston 145 and is linearly advanced along central axis 131 by rotating ball nut 134 relative to screw 135 as schematically shown, for example, in FIG. 3B. As such, the rotation of ball nut 134 relative to screw 135 determines the linear motion of screw 135 and piston 145 and also determines the transfer of hydraulic fluid 155 to and from reservoir 140. When piston 145 does not rotate relative to reservoir 140, screw 135 also does not rotate relative to reservoir 140 and other stationary components of apparatus 100. As such, the rotation of ball nut 134 relative to screw 135 is precisely controllable by rotary actuator 120, which is coupled to ball nut 134 by gear train 125. In other words, the rotation of ball nut 134 relative to screw 135 is only controlled by the rotation of rotary actuator 120, since screw 135 and piston 145 do not rotate.

FIGS. 3C-3F illustrate various examples of features and mechanisms used to ensure that piston 145 does not rotate relative to reservoir 140 yet is able to advance and/or retract within reservoir 140 along central axis 131. Specifically, FIG. 3C illustrates anti-rotation mechanism 139, which comprises slot 192 and protrusion 191 protruding into slot 192. Slot 192 is formed in screw 135, while protrusion 191 is attached to housing 138 of linear actuator 130. However, other arrangements are also within the scope of the present disclosure, e.g., a slot in housing 138 and a protrusion in screw 135, a slot in piston 145 and a protrusion in reservoir 140, a slot in reservoir 140 and a protrusion in piston 145, and the like. Both slot 192 and protrusion 191 extend along central axis 131 of screw 135, which allows piston 145 to advance and/or retract within reservoir 140 along central axis 131.

FIG. 3C illustrates another example of anti-rotation mechanism 139, which comprises first surface 193, and second surface 194 slidably contacting first surface 193 at least two points of first surface 193 that lie on opposite sides of orthogonal projection 132 of central axis 131 onto first surface 193. In this example, first surface 193 is on screw 135, while second surface 194 is on protrusion 191 attached to housing 138. However, other arrangements are also within the scope of the present disclosure.

FIGS. 5E and 5F illustrate two examples of cross-sections of piston 145 and reservoir 140 in a plane perpendicular to central axis 131. These examples show piston 145 and reservoir 140 having complementary non-circular cross-sections. These non-circular cross-sections provide a seal between piston 145 and reservoir 140 and allow piston 145 to advance and/or retract within reservoir 140 along central axis 131. FIG. 3E illustrates a specific example where these complementary non-circular cross-sections are oval. FIG. 3E illustrates another example where these complementary non-circular cross-sections are rectangular.

Examples of the present disclosure may be described in the context of method 1100 for aircraft manufacturing and service as shown in FIG. 8A and aircraft 1102 as shown in FIG. 8B. During pre-production, method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 8B, aircraft 1102 produced by method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages (shown as block 1108 and block 1110), for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

The invention claimed is:

1. An apparatus for dispensing a flowable material, the apparatus comprising:
a rotary actuator;
a reservoir, containing a hydraulic fluid;
a piston, movable inside the reservoir;
a linear actuator, coupled to the piston;
a gear train, coupling the rotary actuator with the linear actuator;
a flowable-material dispenser, hydraulically coupled with the reservoir and comprising a cartridge housing, a cartridge-ejection inlet, and a plunger, wherein:
the cartridge housing has a first end and a second end, opposite the first end;
the cartridge housing is configured to receive a cartridge tube, having an interior, filled with the flowable material; and
the plunger is selectively translatable within the cartridge tube once the cartridge tube is received in the cartridge housing and the plunger is received within the cartridge tube;
an end-cap, movably coupled with the flowable-material dispenser at the first end of the cartridge housing, hydraulically coupled with the reservoir, and configured to selectively sealingly engage the interior of the cartridge tube when the cartridge tube is received within the cartridge housing of the flowable-material dispenser; and
a second end-cap, located opposite the end-cap at the second end of the cartridge housing of the flowable-material dispenser and configured to seal against the cartridge tube when the cartridge tube is within the cartridge housing and the end-cap is retained relative to the cartridge housing such that the end-cap sealingly engages the interior of the cartridge tube, wherein the cartridge-ejection inlet is pneumatically coupled with the second end-cap to selectively supply compressed fluid inside the cartridge housing of the flowable-material dispenser for ejecting the cartridge tube from the cartridge housing when the end-cap is removed from the cartridge tube, received within the cartridge housing.

2. The apparatus according to claim 1, wherein:
the plunger is translatable within the cartridge tube responsive to motion of the piston inside the reservoir; and
the motion of the piston inside the reservoir transfers the hydraulic fluid between the reservoir and the cartridge housing of the flowable-material dispenser.

3. The apparatus according to claim 1, wherein the end-cap comprises a first gasket, configured to selectively seal against the interior of the cartridge tube when the cartridge tube is received within the cartridge housing.

4. The apparatus according to claim 3, wherein:
the end-cap further comprises an annular boss;
the plunger comprises an annular recess; and
the annular boss and the annular recess have complementary shapes.

5. The apparatus according to claim 4, further comprising a second gasket between the annular boss of the end-cap and the annular recess of the plunger.

6. The apparatus according to claim 1, wherein:
the flowable-material dispenser further comprises a vent, located at the second end of the cartridge housing; and
the vent is configured to admit atmosphere into the cartridge tube, received inside the cartridge housing, as the plunger is retracted within the cartridge tube from the second end of the cartridge housing toward the first end of the cartridge housing.

7. The apparatus according to claim 6, wherein the vent is further configured to admit atmosphere into the cartridge tube, received inside the cartridge housing, as the plunger is extracted from the cartridge tube by the end-cap.

8. The apparatus according to claim 1, wherein the piston comprises a gasket.

9. The apparatus according to claim 1, wherein:
the cartridge tube comprises a cartridge plunger, comprising a rear surface and a front surface, opposite the rear surface; and
the plunger comprises a thrust surface, complementary in shape to the rear surface of the cartridge plunger.

10. The apparatus according to claim 1, wherein the flowable-material dispenser further comprises a dispenser valve, located at the second end of the cartridge housing, and a double-acting pneumatic cylinder, configured to selectively open or close the dispenser valve.

11. The apparatus according to claim 1, wherein:
the linear actuator comprises a screw, a ball nut, and a plurality of balls, threadably coupling the screw and the ball nut;
the screw has a central axis and is coupled to the piston; and
the ball nut is coupled to one of gears in the gear train.

12. The apparatus according to claim 11, wherein:
the linear actuator comprises a housing and an anti-rotation mechanism, coupled to the housing and slidably coupled to the screw and preventing the screw from rotating around the central axis of the screw relative to the housing, and
wherein the housing is stationary relative to the rotary actuator.

13. The apparatus according to claim 12, wherein:
the screw comprises a slot;
the anti-rotation mechanism comprises a protrusion, extending into the slot of the screw; and
the slot extends along the central axis of the screw.

14. The apparatus according to claim 1, wherein the piston and the reservoir have complementary non-circular cross-sections.

15. The apparatus according to claim 14, wherein the complementary non-circular cross-sections are oval.

16. The apparatus according to claim 14, wherein the complementary non-circular cross-sections are rectangular.

17. An apparatus for dispensing a flowable material, the apparatus comprising:
a rotary actuator;
a reservoir, containing a hydraulic fluid;
a piston, movable inside the reservoir;
a linear actuator, coupled to the piston;
a gear train, coupling the rotary actuator with the linear actuator;
a flowable-material dispenser, hydraulically coupled with the reservoir and comprising a cartridge housing, a plunger, and a second gasket, wherein:
the cartridge housing has a first end and a second end, opposite the first end;
the cartridge housing is configured to receive a cartridge tube, having an interior, filled with the flowable material; and
the plunger is selectively translatable within the cartridge tube once the cartridge tube is received in the cartridge housing and the plunger is received within the cartridge tube; and an end-cap, movably coupled with the flowable-material dispenser at the first end of the cartridge housing, hydraulically coupled with the reservoir, and configured to selectively sealingly engage the interior of the cartridge tube when the cartridge tube is received within the cartridge housing of the flowable-material dispenser, wherein:
- the end-cap comprises a first gasket, configured to selectively seal against the interior of the cartridge tube when the cartridge tube is received within the cartridge housing, and
- the second gasket is configured to seal the end-cap against the plunger when a sufficient amount of the hydraulic fluid is transferred from the cartridge housing to the reservoir to cause the plunger to abut the end-cap and an additional amount of the hydraulic fluid is subsequently transferred from the cartridge housing to the reservoir.

18. An apparatus for dispensing a flowable material, the apparatus comprising:
- a rotary actuator;
- a reservoir, containing a hydraulic fluid;
- a piston, movable inside the reservoir;
- a linear actuator, coupled to the piston;
- a gear train, coupling the rotary actuator with the linear actuator;
- a flowable-material dispenser, hydraulically coupled with the reservoir and comprising a cartridge housing, and a plunger, wherein:
  - the cartridge housing has a first end and a second end, opposite the first end;
  - the cartridge housing is configured to receive a cartridge tube, having an interior, filled with the flowable material;
  - the plunger is selectively translatable within the cartridge tube once the cartridge tube is received in the cartridge housing and the plunger is received within the cartridge tube;
- an end-cap, movably coupled with the flowable-material dispenser at the first end of the cartridge housing, hydraulically coupled with the reservoir, and configured to selectively sealingly engage the interior of the cartridge tube when the cartridge tube is received within the cartridge housing of the flowable-material dispenser; and
- an over-center mechanism, movably coupling the end-cap with the cartridge housing of the flowable-material dispenser and configured to selectively retain the end-cap relative to the cartridge housing such that the end-cap sealingly engages the interior of the cartridge tube, received within the cartridge housing, and to selectively remove the end-cap from the cartridge tube, received within the cartridge housing.

19. The apparatus according to claim 18, further comprising a first double-acting pneumatic cylinder, operatively coupling the over-center mechanism with the cartridge housing of the flowable-material dispenser.

* * * * *